US012631065B2

(12) United States Patent　　　　　(10) Patent No.: US 12,631,065 B2
Choi et al.　　　　　　　　　　　　　(45) Date of Patent: May 19, 2026

(54) APPARATUS AND A METHOD FOR MANUFACTURING A MULTI-PANE GLASS UNIT

(71) Applicant: Corning Incorporated, Corning, NY (US)

(72) Inventors: Jae-Young Choi, Seoul (KR); Joon Hoi Kim, Yongin-Si (KR); Young-Ki Oh, Gwangju (KR); Cheolsoon Park, Suwon-si (KR); Jin-Wook Song, Seongnam (KR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/989,151

(22) Filed: Dec. 20, 2024

(65) Prior Publication Data

US 2025/0129659 A1　　Apr. 24, 2025

Related U.S. Application Data

(63) Continuation of application No. 17/785,607, filed as application No. PCT/US2020/063863 on Dec. 9, 2020, now Pat. No. 12,203,320.

(30) Foreign Application Priority Data

Dec. 18, 2019　(KR) ........................ 10-2019-0170213

(51) Int. Cl.
　E06B 3/673　　　　(2006.01)
　B23P 19/10　　　　(2006.01)
　　　　　　(Continued)

(52) U.S. Cl.
　CPC .......... E06B 3/67365 (2013.01); B23P 19/10 (2013.01); B32B 7/02 (2013.01);
　　　　　　(Continued)

(58) Field of Classification Search
　CPC ...... B23P 11/00; B23P 19/10; E06B 3/67365; B65G 49/063; B65G 49/064; B65G 49/061
　See application file for complete search history.

(56) References Cited

U.S. PATENT DOCUMENTS

| 4,113,904 A | 9/1978 | Kiefer |
| 4,298,389 A | 11/1981 | Johnson et al. |
| | (Continued) | |

FOREIGN PATENT DOCUMENTS

| CN | 102667044 A | 9/2012 |
| CN | 104609744 A | 5/2015 |
| | (Continued) | |

OTHER PUBLICATIONS

European Patent Application No. 20901982.7, Extended European Search Report dated Nov. 24, 2023, 9 pages, European Patent Office.

(Continued)

*Primary Examiner* — Jermie E Cozart

(57)　　　　　　ABSTRACT

Provided is an apparatus for manufacturing a multi-pane glass unit. The apparatus includes: a first plate configured to hold a first glass pane; a second plate configured to hold a second glass pane such that the second glass pane faces the first glass pane; and a conveyer including a first portion configured to convey the first glass pane onto the first plate and a second portion configured to convey the second glass pane onto the second plate.

8 Claims, 41 Drawing Sheets

(51) Int. Cl.

| | |
|---|---|
| *B32B 7/02* | (2019.01) |
| *B32B 7/05* | (2019.01) |
| *B32B 17/06* | (2006.01) |
| *B32B 37/02* | (2006.01) |
| *B32B 37/18* | (2006.01) |
| *B32B 38/18* | (2006.01) |
| *B65G 49/06* | (2006.01) |
| *E06B 3/663* | (2006.01) |
| *B23P 11/00* | (2006.01) |
| *E06B 3/66* | (2006.01) |

(52) U.S. Cl.
CPC ................ *B32B 7/05* (2019.01); *B32B 17/06* (2013.01); *B32B 37/02* (2013.01); *B32B 37/18* (2013.01); *B32B 38/1833* (2013.01); *B65G 49/063* (2013.01); *E06B 3/66309* (2013.01); *E06B 3/67326* (2013.01); *B23P 11/00* (2013.01); *B32B 2307/102* (2013.01); *B32B 2307/304* (2013.01); *B32B 2307/732* (2013.01); *B32B 2315/08* (2013.01); *B32B 2419/00* (2013.01); *B32B 2509/10* (2013.01); *B32B 2605/08* (2013.01); *B32B 2605/10* (2013.01); *B65G 49/064* (2013.01); *E06B 3/6617* (2013.01)

(56) References Cited

U.S. PATENT DOCUMENTS

| | | | |
|---|---|---|---|
| 5,027,941 | A | 7/1991 | Lenhardt et al. |
| 5,270,084 | A | 12/1993 | Parker |
| 5,332,080 | A | 7/1994 | Lenhardt et al. |
| 5,573,618 | A | 11/1996 | Rueckheim |
| 6,609,611 | B1 | 8/2003 | Lenhardt |
| 6,962,638 | B2 | 11/2005 | Okino et al. |
| 7,891,066 | B2 | 2/2011 | Aoki et al. |
| 9,567,793 | B2 | 2/2017 | Mader |
| 12,203,320 | B2 * | 1/2025 | Choi .................. B32B 7/02 |
| 2009/0324858 | A1 | 12/2009 | Jaeger |
| 2010/0211215 | A1 | 8/2010 | Yano et al. |
| 2011/0261429 | A1 | 10/2011 | Sbar et al. |
| 2012/0222373 | A1 | 9/2012 | Bouesnard et al. |
| 2012/0285605 | A1 | 11/2012 | Ripoche et al. |
| 2012/0297707 | A1 | 11/2012 | Lenz et al. |
| 2014/0290156 | A1 | 10/2014 | Bruce et al. |
| 2015/0275567 | A1 | 10/2015 | Jun |
| 2017/0028686 | A1 | 2/2017 | Wilson et al. |
| 2017/0119176 | A1 | 5/2017 | Christiansen et al. |
| 2017/0282637 | A1 | 10/2017 | Barazin |
| 2017/0328119 | A1 | 11/2017 | Kuster et al. |
| 2018/0038151 | A1 | 2/2018 | Clarahan |
| 2018/0044972 | A1 | 2/2018 | Bauer et al. |
| 2018/0216396 | A1 | 8/2018 | Isaacs |
| 2018/0259696 | A1 | 9/2018 | Borrelli et al. |
| 2019/0284868 | A1 | 9/2019 | Schweitzer et al. |
| 2019/0368263 | A1 | 12/2019 | Begin et al. |
| 2020/0141179 | A1 | 5/2020 | Vianello et al. |
| 2021/0403375 | A1 | 12/2021 | Schneider |
| 2022/0010609 | A1 | 1/2022 | Zucker et al. |
| 2022/0034152 | A1 | 2/2022 | Kuster et al. |
| 2022/0268092 | A1 | 8/2022 | Mller et al. |
| 2023/0015338 | A1 | 1/2023 | De et al. |

FOREIGN PATENT DOCUMENTS

| | | |
|---|---|---|
| CN | 104797772 A | 7/2015 |
| DE | 3308079 C2 | 1/1985 |
| DE | 4437998 A1 | 8/1995 |
| DE | 102010005181 A1 | 7/2011 |
| EP | 2963226 A1 | 1/2016 |
| EP | 3798402 A1 | 3/2021 |
| JP | 09-263428 A | 10/1997 |
| JP | 11-236251 A | 8/1999 |
| JP | 3581154 B2 | 10/2004 |
| JP | 2018-199452 A | 12/2018 |
| KR | 20-1995-0003262 Y1 | 4/1995 |
| KR | 10-0699028 B1 | 3/2007 |
| KR | 10-0828202 B1 | 5/2008 |
| KR | 10-2009-0035937 A | 4/2009 |
| KR | 10-2010-0058708 A | 6/2010 |
| KR | 10-2010-0067993 A | 6/2010 |
| KR | 10-2011-0038229 A | 4/2011 |
| KR | 10-2013-0091375 A | 8/2013 |
| KR | 10-1500683 B1 | 3/2015 |
| WO | 2010/115456 A1 | 10/2010 |
| WO | 2013/114302 A1 | 8/2013 |
| WO | 2014/168219 A1 | 10/2014 |
| WO | 2016/039382 A1 | 3/2016 |

OTHER PUBLICATIONS

International Search Report and Written Opinion of the International Searching Authority; PCT/US2020/063863; mailed on Apr. 8, 2021, 10 pages; Korean Patent Office.

Synowicki et al., Optical properties of soda-lime float glass from spectroscopic ellipsometry, Thin Solid Films, vol. 519 (2011), pp. 2907-2913.

\* cited by examiner

APPARATUS AND A METHOD FOR MANUFACTURING A MULTI-PANE GLASS UNIT

CROSS-REFERENCE TO RELATED APPLICATION

This application is a continuation application of U.S. patent application Ser. No. 17/785,607, filed on Jun. 15, 2022, which is a National Stage application under 35 U.S.C. § 371 of International Application No. PCT/US2020/063863, filed on Dec. 9, 2020, which claims the benefit of Korean Patent Application No. 10-2019-0170213, filed on Dec. 18, 2019, in the Korean Intellectual Property Office, the disclosure of which is incorporated herein in its entirety by reference.

BACKGROUND

1. Field

One or more embodiments relate to an apparatus and method for manufacturing a multi-pane glass unit. More particularly, one or more embodiments relate to an apparatus and method for attaching glass panes to each other.

2. Description of Related Art

Multi-pane glass including a plurality of glass panes may be effective for insulation, sound proof, and/or dew condensation prevention. Such multi-pane glass may be used for windows of buildings, transportation vehicles such as cars or trains, or electronic apparatuses such as refrigerators or freezers.

SUMMARY

One or more embodiments include an apparatus and method for manufacturing a multi-pane glass unit.

Additional aspects will be set forth in part in the description which follows and, in part, will be apparent from the description, or may be learned by practice of the presented embodiments of the disclosure.

According to one or more embodiments, an apparatus for manufacturing a multi-pane glass unit, the apparatus includes: a first plate configured to hold a first glass pane; a second plate configured to hold a second glass pane such that the second glass pane faces the first glass pane; and a conveyer including a first portion configured to convey the first glass pane onto the first plate and a second portion configured to convey the second glass pane onto the second plate, wherein the conveyer is further configured to locate an edge surface of the second glass pane adjacent to the second portion of the conveyer to be higher in a first direction than an edge surface of the first glass pane adjacent to the first portion of the conveyer, and at least one of the first plate and the second plate is further configured to be movable in a second direction that is not parallel to the first direction such that the second glass pane is attached to the first glass pane.

According to some embodiments, the second portion of the conveyer may be configured to convey the second glass pane onto the second plate after the first glass pane is held onto the first plate.

According to some embodiments, the second plate may be further configured to release the second glass pane after the second glass pane is attached to the first glass pane, the first portion of the conveyer may be further configured to convey a third glass pane onto the second plate after the second plate releases the second glass pane, and at least one of the first plate and the second plate may be further configured to be movable in the second direction such that the third glass pane is attached to the second glass pane.

According to some embodiments, the first portion of the conveyer may be further configured to convey a multi-pane glass unit including the first glass pane, the second glass pane attached to the first glass pane, and the third glass pane attached to the second glass pane, after the third glass pane is attached to the second glass pane.

According to some embodiments, a main surface of the first glass pane may be adhered on the first plate when the first plate holds the first glass pane, and a main surface of the second glass pane may be adhered on the second plate when the second plate holds the second glass pane.

According to one or more embodiments, an apparatus for manufacturing a multi-pane glass unit, the apparatus includes: a first plate configured to be movable in a first direction; a second plate spaced apart from the first plate in the first direction; and a conveyer running in a second direction that is not parallel to the first direction and passing below a space between the first plate and the second plate, wherein the conveyer includes a belt including a first portion and a second portion running in parallel in the second direction, and a height of a top surface of the first portion of the belt in a vertical direction is different from a height of a top surface of the second portion of the belt in the vertical direction.

According to some embodiments, a thickness of the first portion of the belt may be different from a thickness of the second portion of the belt.

According to some embodiments, the first portion and the second portion of the belt may run in the second direction at a same speed.

According to some embodiments, each of the first plate and the second plate may be configured to temporarily hold and release a glass pane.

According to some embodiments, the belt may be configured to be movable in the first direction and a direction opposite to the first direction such that the first portion of the belt passes below the space between the first plate and the second plate or the second portion of the belt passes below the space between the first plate and the second plate.

According to one or more embodiments, a method of manufacturing a multi-pane glass unit, the method includes: conveying a first glass pane onto a first plate by using a first portion of a conveyer; holding the first glass pane on the first plate; conveying a second glass pane onto a second plate by using a second portion of the conveyer; holding the second glass pane on the second plate; attaching the second glass pane to the first glass pane by moving at least one of the first plate and the second plate in a first direction; separating the second plate from the second glass pane; conveying a third glass pane onto the second plate by using the first portion of the conveyer; holding the third glass pane on the second plate; and attaching the third glass pane to the second glass pane by moving at least one of the first plate and the second plate in the first direction, wherein the conveyer is configured to locate an edge surface of the second glass pane adjacent to the conveyer to be higher in a second direction than an edge surface of the first glass pane adjacent to the conveyer and an edge surface of the third glass pane adjacent to the conveyer.

According to some embodiments, a thickness of the second glass pane may be less than a thickness of the first glass pane and a thickness of the third glass pane.

According to some embodiments, a thickness of the second glass pane may be 0.2 mm to 1.0 mm.

According to some embodiments, the second glass pane may not be subjected to a strengthening process.

According to some embodiments, an area of the second glass pane may be less than an area of the first glass pane and an area of the third glass pane.

According to some embodiments, a circumference of the second glass pane may be offset inward with respect to a circumference of the first glass pane and a circumference of the third glass pane.

According to some embodiments, the method may further include: moving the conveyer in a direction opposite to the first direction before conveying the second glass pane after conveying the first glass pane; and moving the conveyer in the first direction before conveying the third glass pane after conveying the second glass pane.

According to some embodiments, the method may further include: attaching a first spacer onto the second glass pane before conveying the second glass pane onto the second plate; and attaching a second spacer onto the third glass pane before conveying the third glass pane onto the second plate, wherein the second glass pane may be attached to the first glass pane through the first spacer when the second glass pane is attached to the first glass pane, and the third glass pane may be attached to the second glass pane through the second spacer when the third glass pane is attached to the second glass pane.

According to some embodiments, a portion of the first spacer and a portion of the second spacer may protrude outside a circumference of the second glass pane.

According to some embodiments, the portion of the first spacer may contact the portion of the second spacer.

According to some embodiments, at least one of the portion of the first spacer and the portion of the second spacer may contact the edge surface of the second glass pane.

According to some embodiments, a circumference of the first spacer and a circumference of the second spacer may be offset inward with respect to a circumference of the first glass pane and a circumference of the third glass pane.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
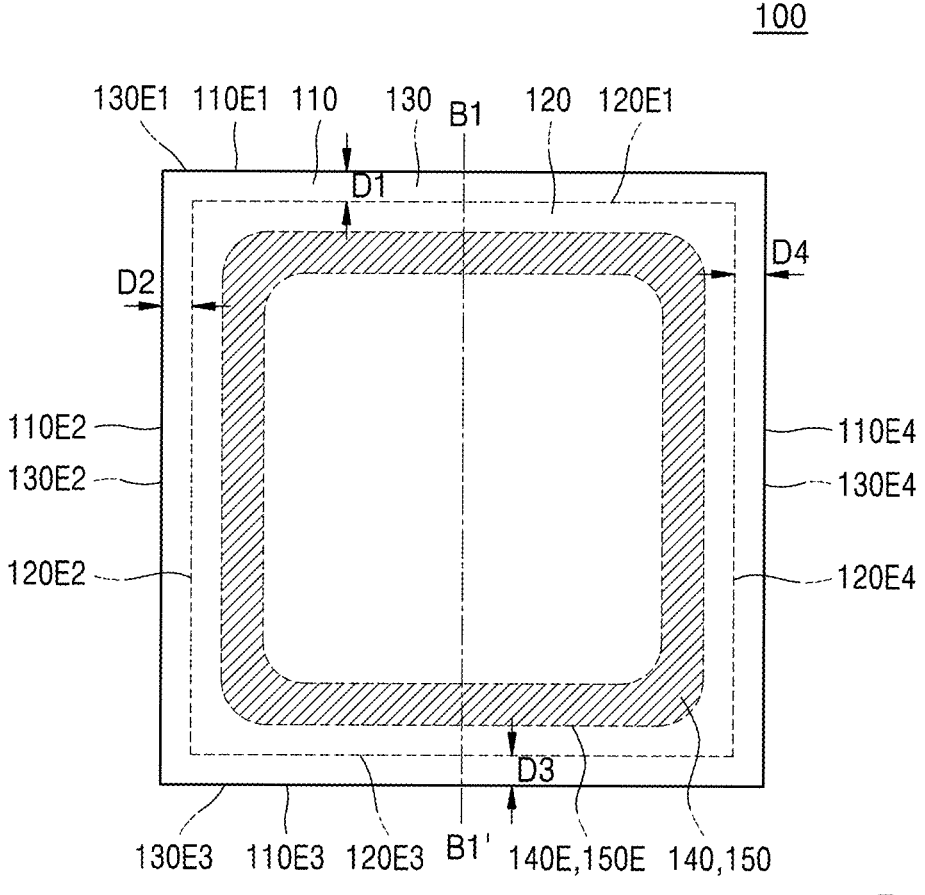
FIG. 1A is a plane view of a multi-pane glass unit according to an embodiment of the disclosure.

Hereinafter, exemplary embodiments of the disclosure will be described in detail with reference to the accompanying drawings. However, the embodiments of the disclosure may be modified in many different forms and the scope of the disclosure should not be construed as being limited by the embodiments described below. The embodiments of the disclosure may be interpreted as being provided to more fully explain the disclosure to one of ordinary skill in the art. Like reference numerals may denote like elements throughout this specification. Furthermore, various elements and regions in the drawings are schematically drawn. Accordingly, the concept of the disclosure is not limited by the relative size or distance drawn in the accompanying drawings.

Figure 1B:
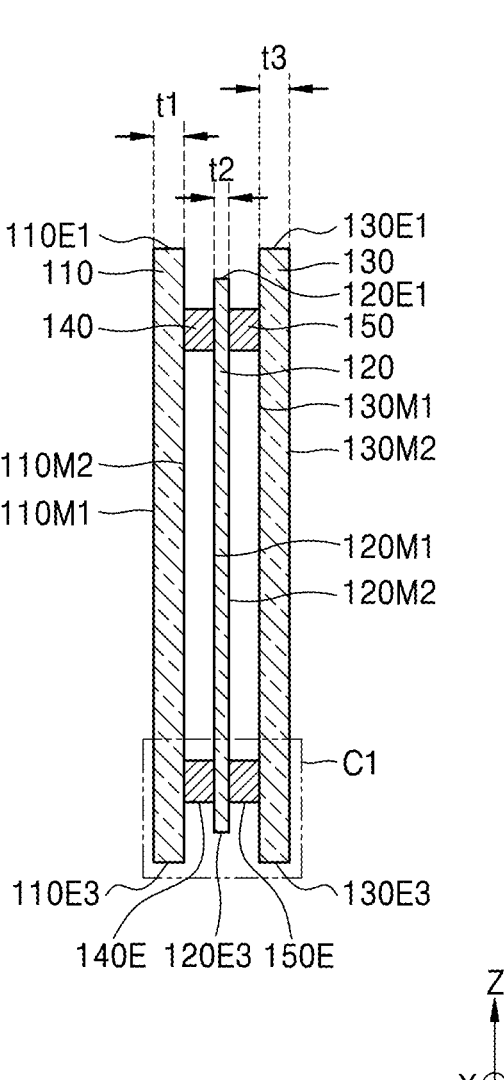
FIG. 1B is a cross-sectional view of the multi-pane glass unit of FIG. 1A taken along a line B1-B1'.
Figure 1C:
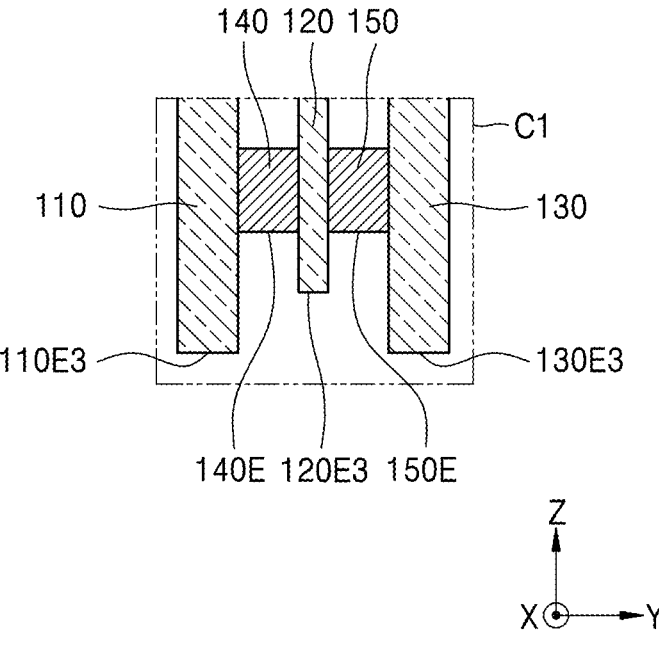
FIG. 1C is an enlarged view of a region C1 of FIG. 1B.

FIG. 1A is a plane view of a multi-pane glass unit 100 according to an embodiment of the disclosure. FIG. 1B is a cross-sectional view of the multi-pane glass unit 100 of FIG. 1A taken along a line B1-B1'. FIG. 1C is an enlarged view of a region C1 of FIG. 1B.

Referring to FIGS. 1A through 1C, the multi-pane glass unit 100 may include a plurality of glass panes. For example, the multi-pane glass unit 100 may include a first glass pane 110, a second glass pane 120, and a third glass pane 130. The first glass pane 110 and third glass pane 130 may each be referred to as an external glass pane and the second glass pane 120 located between the first glass pane 110 and the third glass pane 130 may be referred to as an internal glass pane. According to some embodiments, the multi-pane glass unit 100 may include more than three glass panes. In other words, the multi-pane glass unit 100 may include a plurality of the second glass panes 120 between two external glass panes, i.e., the first and third glass panes 110 and 130. Insulation and/or sound proof characteristics of the multi-pane glass unit 100 may improve as the number of second glass panes 120 included in the multi-pane glass unit 100 is increased.

The first glass pane 110 may include two main surfaces, i.e., first and second main surfaces 110M1 and 110M2, which face each other, and a circumference surrounding the first and second main surfaces 110M1 and 110M2. The circumference of the first glass pane 110 may include at least one edge surface between the first and second main surfaces 110M1 and 110M2. For example, each of the first and second main surfaces 110M1 and 110M2 of the first glass pane 110 may be rectangular and the circumference of the first glass pane 110 may include first through fourth edge surfaces 110E1 through 110E4. According to another embodiment, each of the first and second main surfaces 110M1 and 110M2 of the first glass pane 110 may have a shape other than a rectangle, and the number of edge surfaces forming the circumference of the first glass pane 110 may be less than or greater than four. According to some embodiments, the first and second main surfaces 110M1 and 110M2 of the first glass pane 110 may be substantially parallel to each other. According to another embodiment, the first and second main surfaces 110M1 and 110M2 of the first glass pane 110 may not be substantially parallel to each other.

Similarly, the third glass pane 130 may include two main surfaces, i.e., first and second main surfaces 130M1 and 130M2, which face each other, and a circumference surrounding the first and second main surfaces 130M1 and 130M2. The circumference of the third glass pane 130 may include at least one edge surface between the first and second main surfaces 130M1 and 130M2. For example, each of the first and second main surfaces 130M1 and 130M2 of the third glass pane 130 may be rectangular and the circumference of the third glass pane 130 may include first through fourth edge surfaces 130E1 through 130E4. According to another embodiment, each of the first and second main surfaces 130M1 and 130M2 of the third glass pane 130 may have a shape other than a rectangle, and the number of edge surfaces forming the circumference of the third glass pane 130 may be less than or greater than four. According to some embodiments, the first and second main surfaces 130M1 and 130M2 of the third glass pane 130 may be substantially parallel. According to another embodiment, the first and second main surfaces 130M1 and 130M2 of the third glass pane 130 may not be substantially parallel to each other.

The second glass pane 120 may include two main surfaces, i.e., first and second main surfaces 120M1 and 120M2, which face each other, and a circumference surrounding the first and second main surfaces 120M1 and 120M2. The circumference of the second glass pane 120 may include at least one edge surface (용어 일치를 위해 부재번호 미번역) between the first and second main surfaces 120M1 and 120M2. For example, each of the first and second main surfaces 120M1 and 120M2 of the second glass pane 120 may be rectangular and the circumference of the second glass pane 120 may include first through fourth edge surfaces 120E1 through 120E4. According to another embodiment, each of the first and second main surfaces 120M1 and 120M2 of the second glass pane 120 may have a shape other than a rectangle, and the number of edge surfaces forming the circumference of the second glass pane 120 may be less than or greater than four. According to some embodiments, the first and second main surfaces 120M1 and 120M2 of the second glass pane 120 may be substantially parallel to each other. According to another embodiment, the first and second main surfaces 120M1 and 120M2 of the second glass pane 120 may not be substantially parallel to each other.

The first main surface 120M1 of the second glass pane 120 may face the second main surface 110M2 of the first glass pane 110, and the second main surface 120M2 of the second glass pane 120 may face the first main surface 130M1 of the third glass pane 130. According to some embodiments, the first main surface 120M1 of the second glass pane 120 may be substantially parallel to the second main surface 110M2 of the first glass pane 110, and the second main surface 120M2 of the second glass pane 120 may be substantially parallel to the first main surface 130M1 of the third glass pane 130. According to another embodiment, the first main surface 120M1 of the second glass pane 120 may not be substantially parallel to the second main surface 110M2 of the first glass pane 110, and the second main surface 120M2 of the second glass pane 120 may not be substantially parallel to the first main surface 130M1 of the third glass pane 130.

According to some embodiments, a thickness t1 of the first glass pane 110 between the first and second main surfaces 110M1 and 110M2 of the first glass pane 110 and a thickness t3 of the third glass pane 130 between the first and second main surfaces 130M1 and 130M2 of the third glass pane 130 may each be about 1 mm to about 50 mm. According to some embodiments, a thickness t2 of the second glass pane 120 between the first and second main surfaces 120M1 and 120M2 of the second glass pane 120 may be less than the thickness t1 of the first glass pane 110 and the thickness t3 of the third glass pane 130. For example, the thickness t2 of the second glass pane 120 may be from about 0.2 mm to about 1.0 mm. As the thickness t2 of the second glass pane 120 is decreased, the weight of the multi-pane glass unit 100 may be decreased and light transmittance may be increased. For example, when the thickness t2 of the second glass pane 120 is about $\frac{1}{10}$ of the thickness t1 of the first glass pane 110 and the thickness t3 of the third glass pane 130, the weight of the multi-pane glass unit 100 may be reduced by about 30% compared to the case when the thickness t2 of the second glass pane 120 is equal to the thickness t1 of the first glass pane 110 and the thickness t3 of the third glass pane 130. However, when the thickness t2 of the second glass pane 120 is too small, it may be difficult to handle the second glass pane 120. In particular, when the thickness t2 of the second glass pane 120 is less than about 1.0 mm, a strengthening process, such as heat-strengthening or chemical strengthening is not possible. According to some embodiments, the second glass pane 120 may not undergo the strengthening process, such as the heat-strengthening or chemical strengthening. Thus, in this case, the thickness t2 of the second glass pane 120 may be about 1.0 mm or less. However, when the thickness t2 of the second glass pane 120 is less than about 0.2 mm, handling of the second glass pane 120 may be difficult and thus manufacturing of the multi-pane glass unit 100 may be difficult. Accordingly, the thickness t2 of the second glass pane 120 may be about 0.2 mm or greater.

When the thickness t2 of the second glass pane 120 is less than the thickness t1 of the first glass pane 110 and the thickness t3 of the third glass pane 130, the second glass pane 120 may be more vulnerable to damage caused by physical contact and/or impact than the first glass pane 110 and the third glass pane 130. In this case, to protect the second glass pane 120 from physical contact and/or impact, the circumference of the second glass pane 120 may be offset inward with respect to the circumference of the first glass pane 110 and the circumference of the third glass pane 130. For example, the first edge surface 120E1 of the second glass pane 120 may be offset inward (in a −Z direction) with respect to the first edge surface 110E1 of the first glass pane 110 and the first edge surface 130E1 of the third glass pane 130. The second edge surface 120E2 of the second glass pane 120 may be offset inward (in a +X direction) with respect to the second edge surface 110E2 of the first glass pane 110 and the second edge surface 130E2 of the third glass pane 130. The third edge surface 120E3 of the second glass pane 120 may be offset inward (in a +Z direction) with respect to the third edge surface 110E3 of the first glass pane 110 and the third edge surface 130E3 of the third glass pane 130. The fourth edge surface 120E4 of the second glass pane 120 may be offset inward (in a –X direction) with respect to the fourth edge surface 110E4 of the first glass pane 110 and the fourth edge surface 130E4 of the third glass pane 130.

According to some embodiments, a distance D1 by which the first edge surface 120E1 of the second glass pane 120 is offset inward (in the –Z direction) with respect to the first edge surface 110E1 of the first glass pane 110 and the first edge surface 130E1 of the third glass pane 130, a distance D2 by which the second edge surface 120E2 of the second glass pane 120 is offset inward (in the +X direction) with respect to the second edge surface 110E2 of the first glass pane 110 and the second edge surface 130E2 of the third glass pane 130, a distance D3 by which the third edge surface 120E3 of the second glass pane 120 is offset inward (in the +Z direction) with respect to the third edge surface 110E3 of the first glass pane 110 and the third edge surface 130E3 of the third glass pane 130, and a distance D4 by which the fourth edge surface 120E4 of the second glass pane 120 is offset inward (in the –X direction) with respect to the fourth edge surface 110E4 of the first glass pane 110 and the fourth edge surface 130E4 of the third glass pane 130 may be substantially the same. According to another embodiments, at least a pair among the distance D1 by which the first edge surface 120E1 of the second glass pane 120 is offset inward (in the –Z direction) with respect to the first edge surface 110E1 of the first glass pane 110 and the first edge surface 130E1 of the third glass pane 130, the distance D2 by which the second edge surface 120E2 of the second glass pane 120 is offset inward (in the +X direction) with respect to the second edge surface 110E2 of the first glass pane 110 and the second edge surface 130E2 of the third glass pane 130, the distance D3 by which the third edge surface 120E3 of the second glass pane 120 is offset inward (in the +Z direction) with respect to the third edge surface 110E3 of the first glass pane 110 and the third edge surface 130E3 of the third glass pane 130, and the distance D4 by which the fourth edge surface 120E4 of the second glass pane 120 is offset inward (in the –X direction) with respect to the fourth edge surface 110E4 of the first glass pane 110 and the fourth edge surface 130E4 of the third glass pane 130 may be substantially different from each other. Each of the distances D1 through D4 may be from about 0.1 mm to about 100 mm, for example, from about 1 mm to about 10 mm, for example, from about 1 mm to about 5 mm.

According to some embodiments, an area of the second glass pane 120, for example, an area of each of the first and second main surfaces 120M1 and 120M2 of the second glass pane 120, may be less than an area of the first glass pane 110, for example, an area of each of the first and second main surfaces 110M1 and 110M2 of the first glass pane 110, and an area of the third glass pane 130, for example, an area of each of the first and second main surfaces 130M1 and 130M2 of the third glass pane 130. According to some embodiments, a length of the second glass pane 120 in the Z direction may be less than a length of the first glass pane 110 in the Z direction and a length of the third glass pane 130 in the Z direction, and a width of the second glass pane 120 in the X direction may be less than a width of the first glass pane 110 in the X direction and a width of the third glass pane 130 in the X direction.

Each of the first glass pane 110, the second glass pane 120, and the third glass pane 130 may include an arbitrary glass material such as soda lime, borosilicate glass, aluminosilicate glass, boroaluminosilicate glass, or a combination thereof. According to some embodiments, the first glass pane 110 and the third glass pane 130 may each include soda lime glass that is commonly used for windows, and the second glass pane 120 may include boroaluminosilicate glass. The second glass pane 120 may be, for example, Eagle XG® made by Corning Incorporated. Table 1 below shows an exemplary composition of soda lime glass and Table 2 below shows an exemplary composition of boroaluminosilicate glass.

TABLE 1

| | Composition (wt %) |
|---|---|
| $SiO_2$ | 72 to 74 |
| $Na_2O$ | 13 to 14 |
| CaO | 9 to 11 |
| $Al_2O_3$ | 1.0 to 2.0 |
| $K_2O$ | 0.01 to 0.3 |
| MgO | 0.01 to 4.0 |
| $Fe_2O_3$ | 0.01 to 0.2 |
| $TiO_2$ | 0.01 to 0.1 |

TABLE 2

| | Composition (wt %) |
|---|---|
| $SiO_2$ | 55 to 65 |
| $Al_2O_3$ | 15 to 20 |
| $B_2O_3$ | 5 to 15 |
| MgO | 0.1 to 5 |
| CaO | 1 to 10 |
| SrO | 0.5 to 8.0 |
| BaO | 0.01 to 0.5 |

When the second glass pane 120 includes the boroaluminosilicate glass, a thermal expansion coefficient of the boroaluminosilicate glass (for example, about $3\times10^{-6}/°$ C. to about $4\times10^{-6}/°$ C.) may be less than a thermal expansion coefficient of the soda lime glass (for example, about $9\times10^{-6}/°$ C. to about $1\times10^{-5}/°$ C.) even when the second glass pane 120 does not undergo the strengthening process due to the small thickness (for example, 1.0 mm or less) of the second glass pane 120, and thus thermal stress of the second glass pane 120 due to a temperature difference in the second glass pane 120 may be reduced. Accordingly, thermal damage caused by the temperature difference in the second glass pane 120 may be less likely to occur.

When the thickness and/or composition of the second glass pane 120 are different from the thickness and/or composition of each of the first glass pane 110 and the third glass pane 130, a sunlight transmittance of the second glass pane 120 may be greater than a sunlight transmittance of the first glass pane 110 and a sunlight transmittance of the third glass pane 130. For example, the sunlight transmittance of the second glass pane 120 may be 90% to 95% while the sunlight transmittance of each of the first glass pane 110 and the third glass pane 130 may be about 75% to about 85%. Accordingly, the light transmittance of the multi-pane glass unit 100 may be increased compared to when the second glass pane 120 has the same thickness and composition as the first glass pane 110 and the third glass pane 130.

Also, when the thickness and/or composition of the second glass pane 120 are different from the thickness and/or composition of each of the first glass pane 110 and the third glass pane 130, a sunlight absorption of the second glass pane 120 may be less than a sunlight absorption of the first glass pane 110 and a sunlight absorption of the third glass pane 130. For example, the sunlight absorption of the second glass pane 120 may be about 0.1% to about 1.0% while the sunlight absorption of the first glass pane 110 and the third glass pane 130 may be about 5.0% to about 15.0%. In the present specification, the NFRC100-2010 standard is used for a sunlight spectrum. When the sunlight absorption of the second glass pane 120 is small, a temperature rise of the second glass pane 120 is not large when the second glass pane 120 is exposed to the sunlight, and thus a risk of thermal breakage of the second glass pane 120 may be low.

Also, when the composition of the second glass pane 120 is different from the composition of each of the first glass pane 110 and the third glass pane 130, density of the second glass pane 120 may be less than density of the first glass pane 110 and density of the third glass pane 130. For example, the density of the second glass pane 120 including the boroaluminosilicate glass may be about 2.3 g/cm$^3$ to about 2.5 g/cm$^3$, and the density of the first glass pane 110 and the density of the third glass pane 130, the first glass pane 110 and the third glass pane 130 including the soda lime glass, may be about 2.5 g/cm$^3$ to about 2.6 g/cm$^3$. When the density of the second glass pane 120 is small, the weight of the second glass pane 120 may be small, and thus the weight of the multi-pane glass unit 100 may be small.

The multi-pane glass unit 100 may further include a plurality of spacers, i.e., first and second spacers 140 and 150, which separate the plurality of glass panes, i.e., the first through third glass panes 110 through 130. The first glass pane 110 and the second glass pane 120 may be spaced apart from each other by the first spacer 140. In other words, the first spacer 140 may be located between the first glass pane 110 and the second glass pane 120. The third glass pane 130 and the second glass pane 120 may be spaced apart from each other by the second spacer 150. In other words, the second spacer 150 may be located between the third glass pane 130 and the second glass pane 120. The first spacer 140 and the second spacer 150 may include a material, for example, a metal such as aluminum or a plastic composite material such as a warm edge spacer. Each of a space between the first glass pane 110 and the second glass pane 120 and a space between the second glass pane 120 and the third glass pane 130 may be filled with air, an inert gas, or a combination thereof.

According to some embodiments, the first spacer 140 and the second spacer 150 may not protrude outside the circumference of the second glass pane 120. In addition, according to some embodiments, a circumference 140E of the first spacer 140 and a circumference 150E of the second spacer 150 may be offset inward with respect to the circumference of the second glass pane 120. For example, the circumference 140E of the first spacer 140 and the circumference 150E of the second spacer 150 may be offset inward (in the −Z direction) with respect to the third edge surface 120E3 of the second glass pane 120.

Figure 2A:
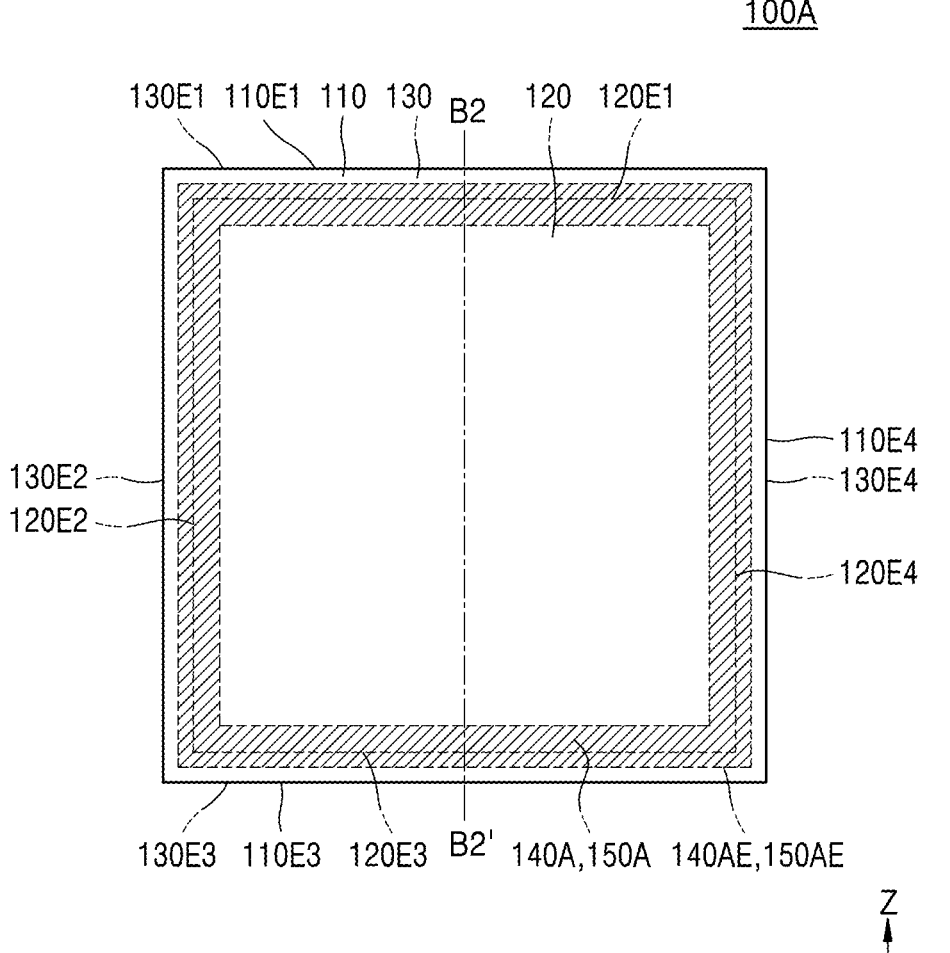
FIG. 2A is a plane view of a multi-pane glass unit according to an embodiment of the disclosure.
Figure 2B:
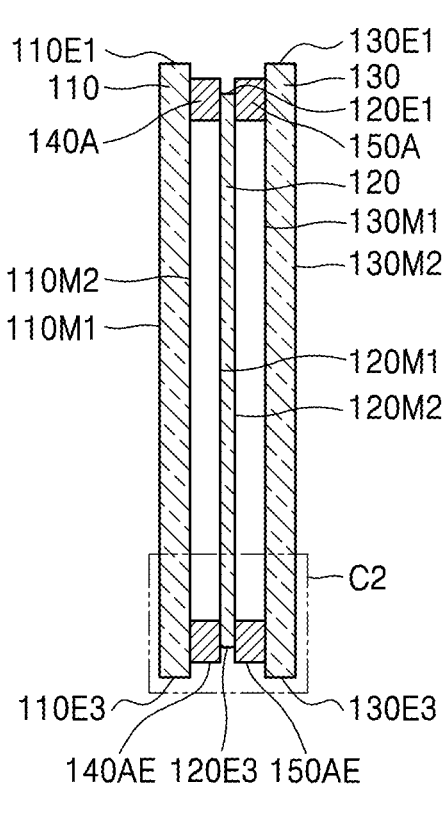
FIG. 2B is a cross-sectional view of the multi-pane glass unit of FIG. 2A taken along a line B2-B2'.
Figure 2C:
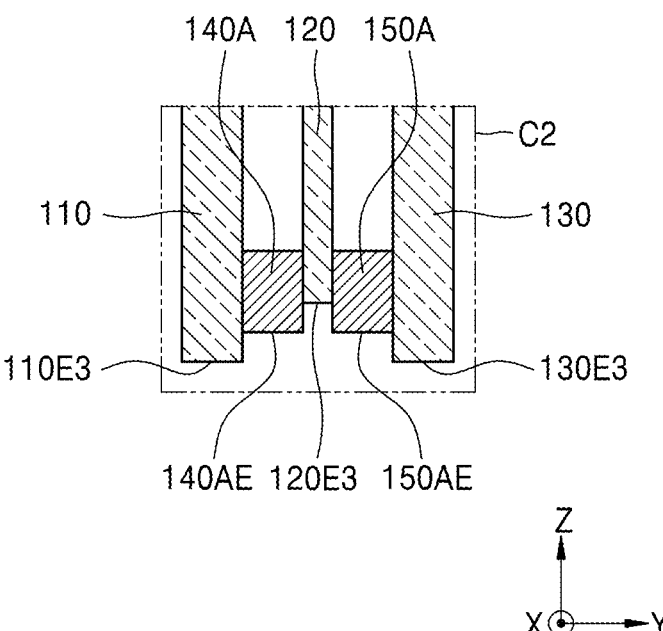
FIG. 2C is an enlarged view of a region C2 of FIG. 2B.

FIG. 2A is a plane view of a multi-pane glass unit 100A according to an embodiment of the disclosure. FIG. 2B is a cross-sectional view of the multi-pane glass unit 100A of FIG. 2A taken along a line B2-B2'. FIG. 2C is an enlarged view of a region C2 of FIG. 2B. Hereinafter, differences between the multi-pane glass unit 100 shown in FIGS. 1A through 1C and the multi-pane glass unit 100A shown in FIGS. 2A through 2C will be described.

Referring to FIGS. 2A through 2C, a portion of a first spacer 140A and a portion of a second spacer 150A may protrude outside the circumference of the second glass pane 120. In other words, a circumference 140AE of the first spacer 140A and a circumference 150AE of the second spacer 150A may be offset outward with respect to the circumference of the second glass pane 120. For example, the circumference 140AE of the first spacer 140A and the circumference 150AE of the second spacer 150A may be offset outward (in the −Z direction) with respect to the third edge surface 120E3 of the second glass pane 120. Because the portion of the first spacer 140A and the portion of the second spacer 150A protrude outside the circumference of the second glass pane 120, the first spacer 140A and the second spacer 150A may further protect the second glass pane 120 from damage caused by physical contact and/or impact. Accordingly, the multi-pane glass unit 100A may have further improved durability.

However, like the multi-pane glass unit 100 shown in FIGS. 1A through 1C, the first spacer 140A and the second spacer 150A may still be offset inward with respect to the circumference of the first glass pane 110 and the circumference of the third glass pane 130. For example, the circumference 140AE of the first spacer 140A and the circumference 150AE of the second spacer 150A may be offset inward (in the +Z direction) with respect to the third edge surface 110E3 of the first glass pane 110 and the third edge surface 130E3 of the third glass pane 130. The portion of the first spacer 140A and the portion of the second spacer 150A protruding outside the circumference of the second glass pane 120 may be spaced apart from each other.

Figure 3:
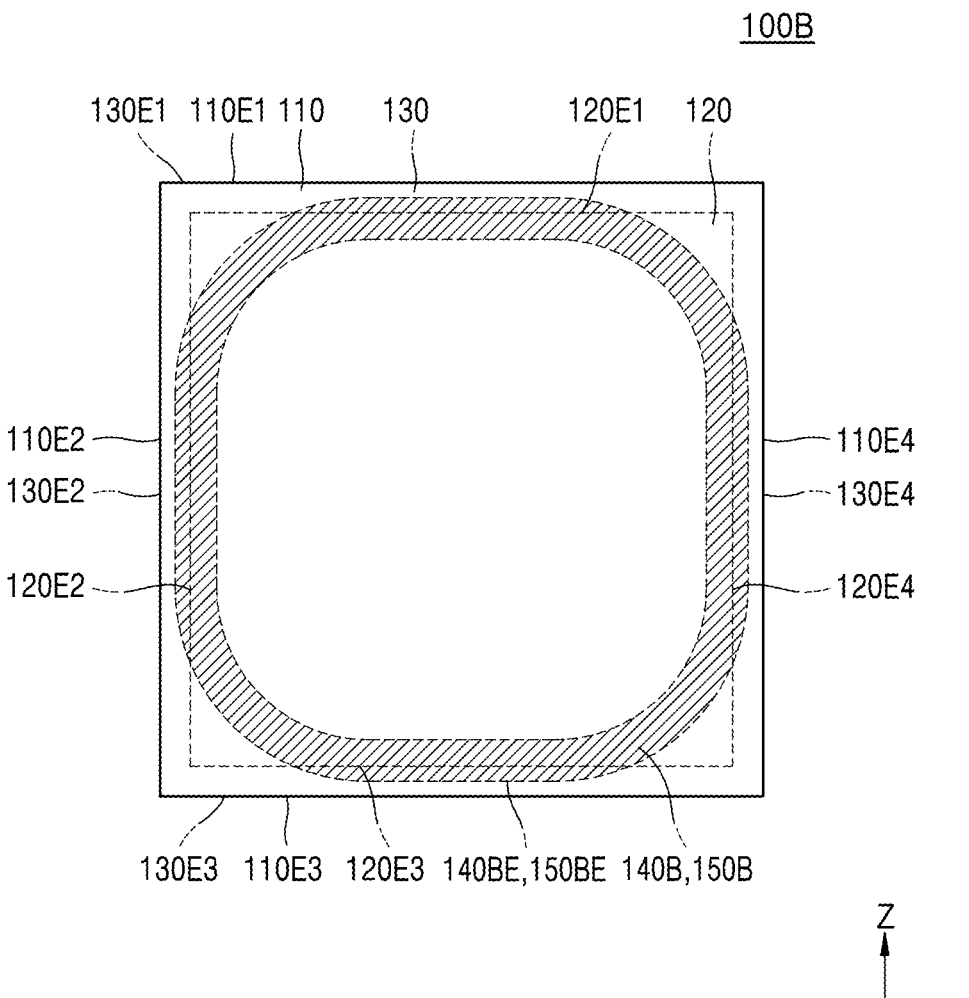
FIG. 3 is a plane view of a multi-pane glass unit according to an embodiment of the disclosure.

FIG. 3 is a plane view of a multi-pane glass unit 100B according to an embodiment of the disclosure. Hereinafter, differences between the multi-pane glass unit 100A shown in FIGS. 2A through 2C and the multi-pane glass unit 100B shown in FIG. 3 will be described.

Referring to FIG. 3, a portion of a circumference 140BE of a first spacer 140B and a portion of a circumference 150BE of a second spacer 150B may be offset outward with respect to the circumference of the second glass pane 120 while the remaining portion of the circumference 140BE of the first spacer 140B and the remaining portion of the circumference 150BE of the second spacer 150B may be offset inward with respect to the circumference of the second glass pane 120.

Figure 4:
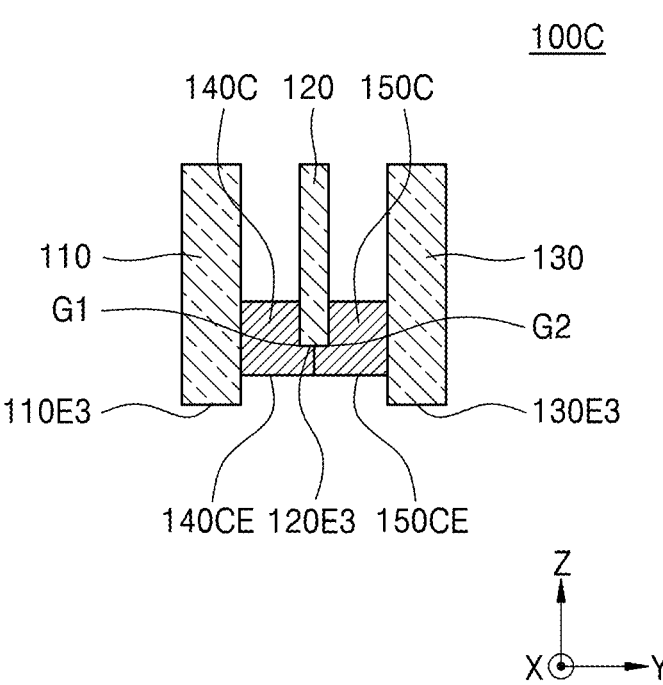
FIG. 4 is an enlarged cross-sectional view of a multi-pane glass unit according to an embodiment of the disclosure.

FIG. 4 is an enlarged cross-sectional view of a multi-pane glass unit 100C according to an embodiment of the disclosure. Hereinafter, differences between the multi-pane glass unit 100A shown in FIGS. 2A through 2C and the multi-pane glass unit 100C shown in FIG. 4 will be described.

Referring to FIG. 4, a portion of a first spacer 140C and a portion of a second spacer 150C, which protrude outside the circumference of the second glass pane 120, may contact each other. According to some embodiments, the portion of the first spacer 140C and the portion of the second spacer 150C, which protrude outside the circumference of the second glass pane 120, may contact the circumference of the second glass pane 120. For example, at least one of the first spacer 140C and the second spacer 150C may contact the third edge surface 120E3 of the second glass pane 120. Because the circumference of the second glass pane 120 may be protected by the first spacer 140C and the second spacer 150C, the first spacer 140C and the second spacer 150C may further protect the second glass pane 120 from damage caused by physical contact and/or impact. Accordingly, the multi-pane glass unit 100C may have further improved durability.

Figure 5A:
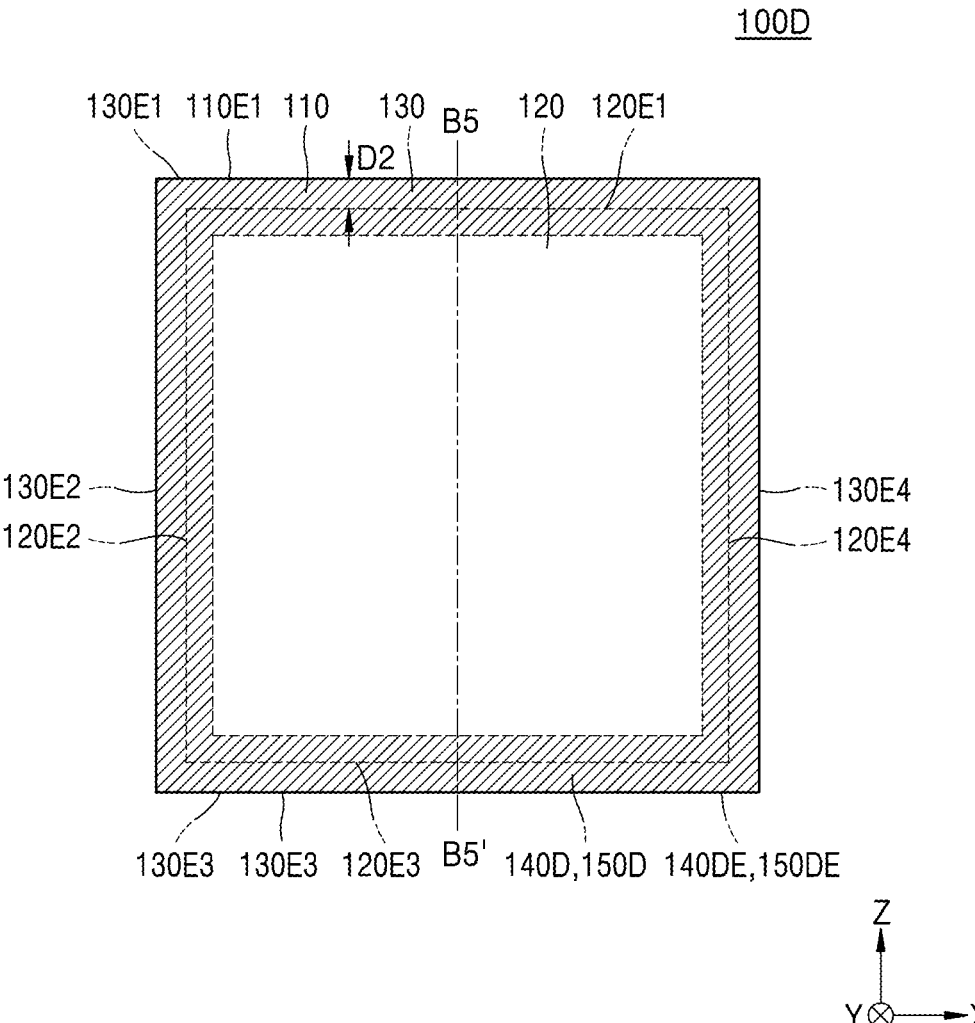
FIG. 5A is a plane view of a multi-pane glass unit according to an embodiment of the disclosure.
Figure 5B:
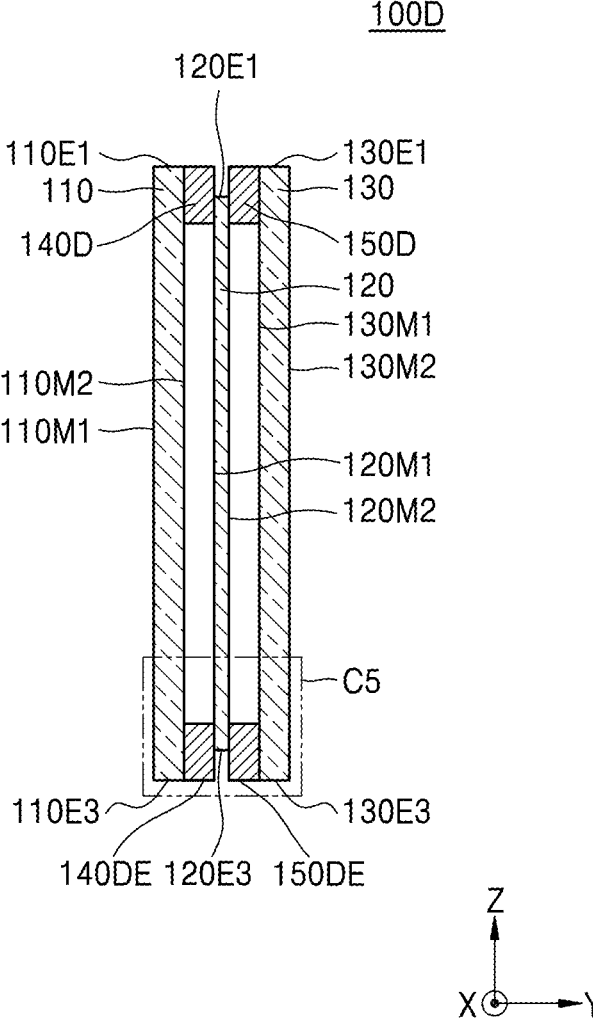
FIG. 5B is a cross-sectional view of the multi-pane glass unit of FIG. 5A taken along a line B5-B5'.
Figure 5C:
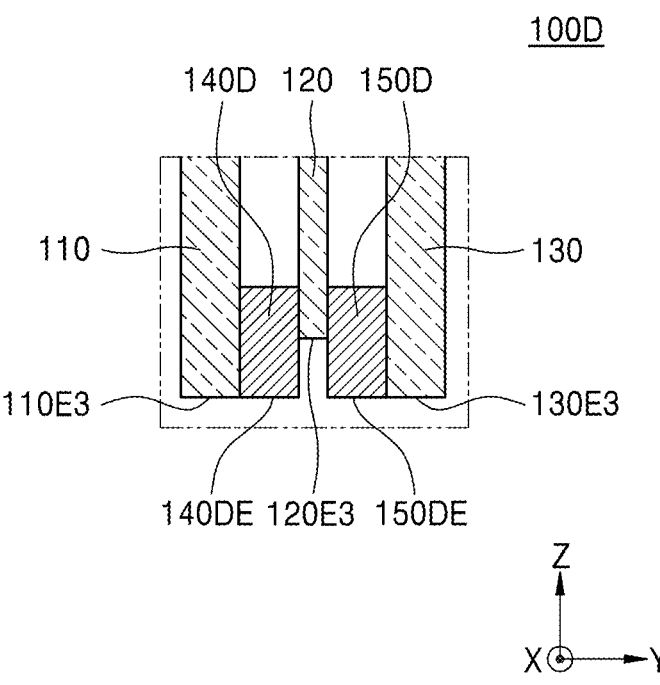
FIG. 5C is an enlarged view of a region C5 of FIG. 5B.

FIG. 5A is a plane view of a multi-pane glass unit 100D according to an embodiment of the disclosure. FIG. 5B is a cross-sectional view of the multi-pane glass unit 100D of FIG. 5A taken along a line B5-B5'. FIG. 5C is an enlarged view of a region C5 of FIG. 5B. Hereinafter, differences between the multi-pane glass unit 100A shown in FIGS. 2A through 2C and the multi-pane glass unit 100D shown in FIGS. 5A through 5C will be described.

Referring to FIGS. 5A through 5C, a circumference 140DE of a first spacer 140D and a circumference 150DE of a second spacer 150D may not be offset inward with respect to the circumference of the first glass pane 110 and the circumference of the third glass pane 130. According to some embodiments, the circumference 140DE of the first spacer 140D and the circumference 150DE of the second spacer 150D may be aligned with the circumference of the first glass pane 110 and the circumference of the third glass pane 130 in the Y direction. However, a portion of the first spacer 140D and a portion of the second spacer 150D may sill protrude outside the circumference of the second glass pane 120, and the circumference of the second glass pane 120 may be offset inward with respect to the circumference of the first glass pane 110 and the circumference of the third glass pane 130.

Figure 6A:
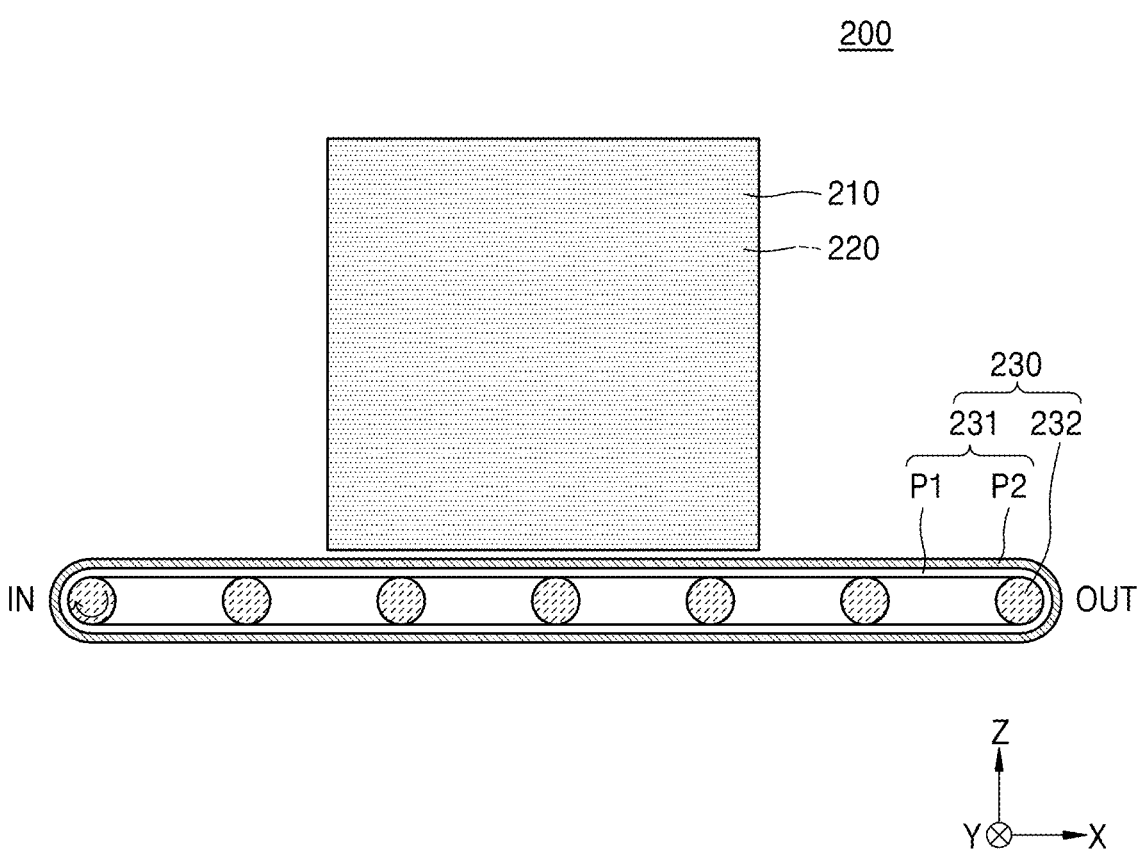
FIGS. 6A and 6B are side views of an apparatus for manufacturing a multi-pane glass unit, according to an embodiment of the disclosure.
Figure 6B:
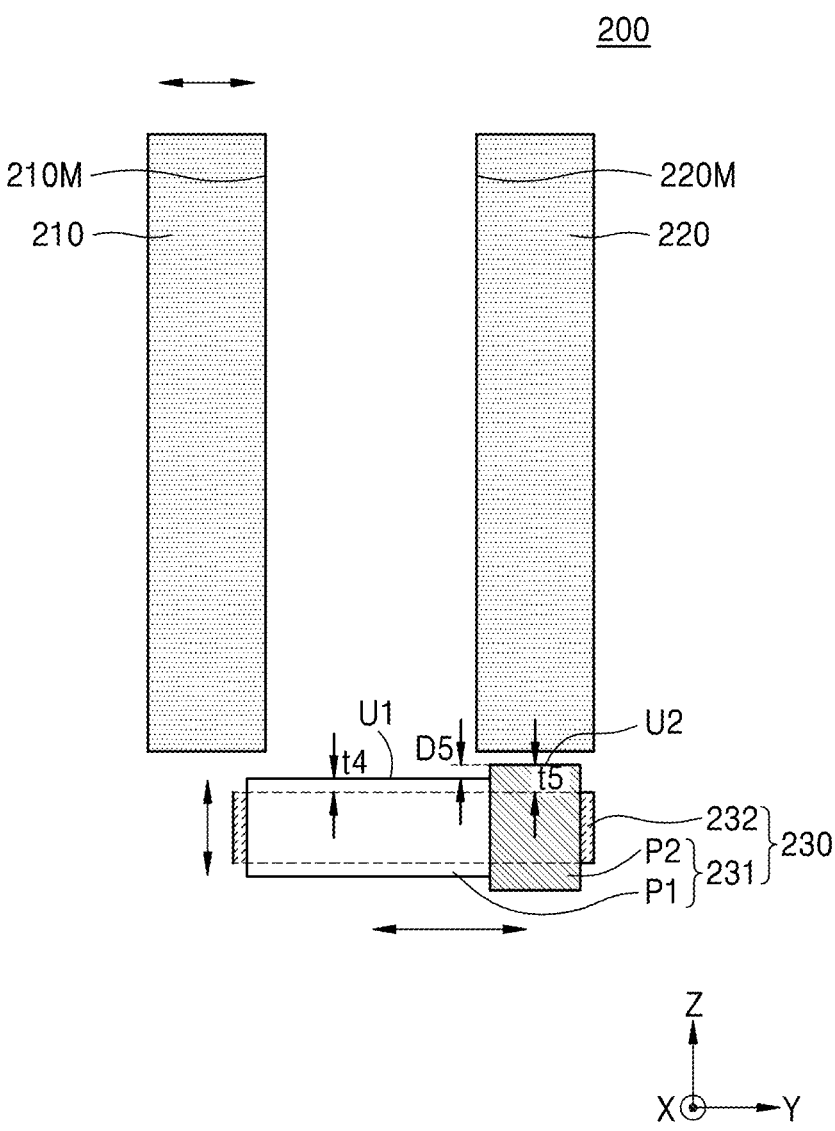

FIGS. 6A and 6B are side views of an apparatus 200 for manufacturing a multi-pane glass unit, according to an embodiment of the disclosure.

Referring to FIGS. 6A and 6B, the apparatus 200 may include a first plate 210, a second plate 220, and a conveyer 230. The first plate 210 may include a surface 210M perpendicular in a Y direction and the second plate 220 may include a surface 220M perpendicular to the Y direction. According to some embodiments, the surface 210M of the first plate 210 and the surface 220M of the second plate 220 may not be completely parallel to a gravity direction but may form an angle of, for example, about 1° to about 15°, with the gravity direction such that a glass pane conveyed onto the second plate 220 does not fall. In other words, the gravity direction may form an angle of about 1° to about 15° with the Z direction. The second plate 220 may be spaced apart from the first plate 210 in the Y direction such that the surface 220M of the second plate 220 faces the surface 210M of the first plate 210. The first plate 210 may be configured to temporarily hold and release a glass pane on the surface 210M of the first plate 210, and the second plate 220 may be configured to temporarily hold and release a glass pane on the surface 220M of the second plate 220. For example, the surface 210M of the first plate 210 and the surface 220M of the second plate 220 may include holes provided with pressure lower than atmospheric pressure. At least one of the first plate 210 and the second plate 220 may be configured to movable in the Y direction. For example, the second plate 220 may be fixed and the first plate 210 may be configured to be movable in the Y direction.

According to some embodiments, the conveyer 230 may pass below a space between the first plate 210 and the second plate 220. The conveyer 230 may be operated in an X direction. In other words, the conveyer 230 may be configured to convey glass panes on the conveyer 230 in the X direction. According to another embodiment, the conveyer 230 may pass above the space between the first plate 210 and the second plate 220. A glass pane may be suspended on the conveyer 230. A first portion P1 and a second portion P2 of the conveyer 230 may be configured such that an edge surface of a second glass pane conveyed by the second portion P2 of the conveyer 230 is located higher than an edge surface of a first glass pane conveyed by the first portion P1 of the conveyer 230. The first portion P1 and the second portion P2 of the conveyer 230 may be configured such that a circumference of the second glass pane conveyed by the second portion P2 of the conveyer 230 is offset inward with respect to a circumference of the first glass pane conveyed by the first portion P1 of the conveyer 230.

According to some embodiments, the conveyer 230 is movable in a Z direction, a –Z direction, the Y direction, and a –Y direction.

According to some embodiments, the conveyer 230 may be a belt conveyer. In other words, the conveyer 230 may include a belt 231 and a plurality of pulleys 232 configured to circulate the belt 231. However, according to another embodiment, the conveyer 230 may be a roller conveyer, a wheel conveyer, or an arbitrary another type of conveyer. According to some embodiments, some pulleys 232, for example, pulleys at a front end and rear end of the conveyer 230, may drive the belt 231 and remaining pulleys 232, for example, middle pulleys in an idle state, may support the belt 231. The belt 231 may include the first portion P1 and the second portion P2. The first portion P1 and the second portion P2 of the belt 231 may be operated in parallel to each other in the X direction. According to some embodiments, the first portion P1 and the second portion P2 of the belt 231 may be operated in the X direction at the same speed by the common pulleys 232. A top surface U1 of the first portion P1 of the belt 231 and a top surface U2 of the second portion P2 of the belt 231 may be located at different heights in a vertical direction (Z direction). For example, the top surface U2 of the second portion P2 of the belt 231 may be located higher than the top surface U1 of the first portion P1 of the belt 231 in the vertical direction (Z direction). In other words, the top surface U2 of the second portion P2 of the belt 231 may be offset in the Z direction with respect to the top surface U1 of the first portion P1 of the belt 231. A distance D5 by which the top surface U2 of the second portion P2 of the belt 231 is offset in the Z direction with respect to the top surface U1 of the first portion P1 of the belt 231 may be about 0.1 mm to about 100 mm, for example, about 1 mm to about 10 mm, for example, about 1 mm to about 5 mm. According to some embodiments, the top surface U2 of the second portion P2 of the belt 231 may be offset with respect to the top surface U1 of the first portion P1 of the belt 231 by using the belt 231 in which a thickness t4 of the first portion P1 of the belt 231 is different from a thickness t5 of the second portion P2 of the belt 231. For example, the thickness t4 of the first portion P1 of the belt 231 may be less than the thickness t5 of the second portion P2 of the belt 231. A difference between the thickness t4 of the first portion P1 of the belt 231 and the thickness t5 of the second portion P2 of the belt 231 may be about 0.1 mm to about 100 mm, for example, about 1 mm to about 10 mm, for example, about 1 mm to about 5 mm.

Figure 7A:
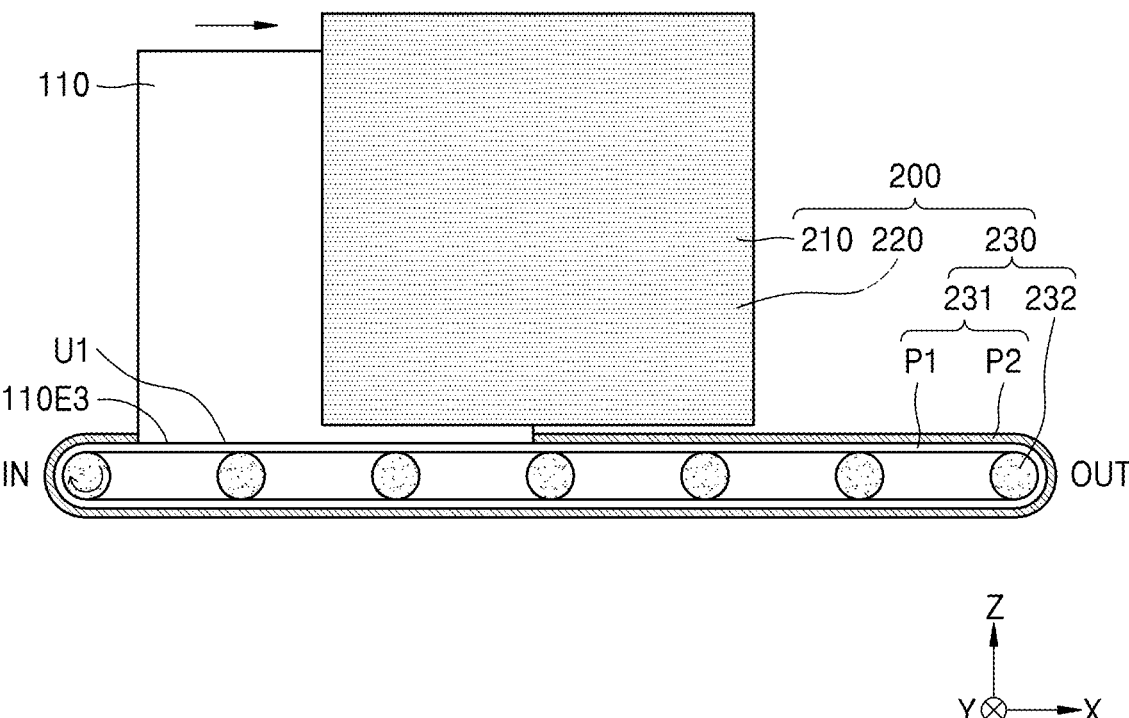
FIGS. 7A through 7S are side views for describing a method of manufacturing a multi-pane glass unit, according to an embodiment of the disclosure.
Figure 7B:
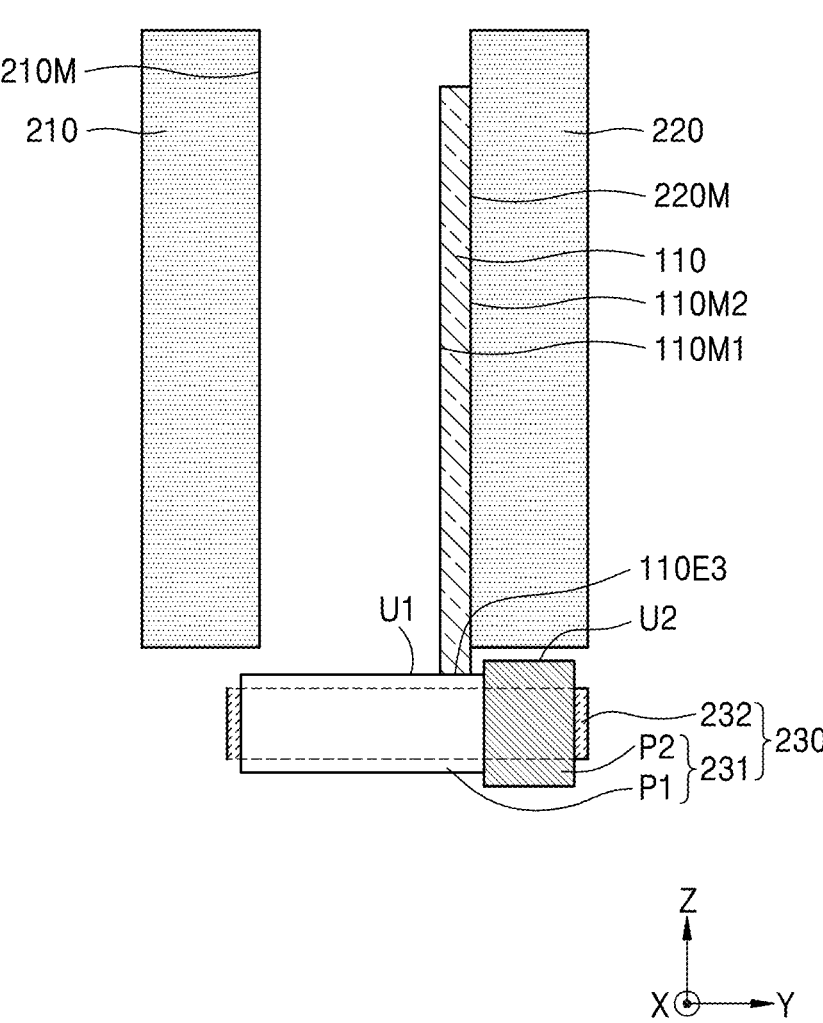
Figure 7C:
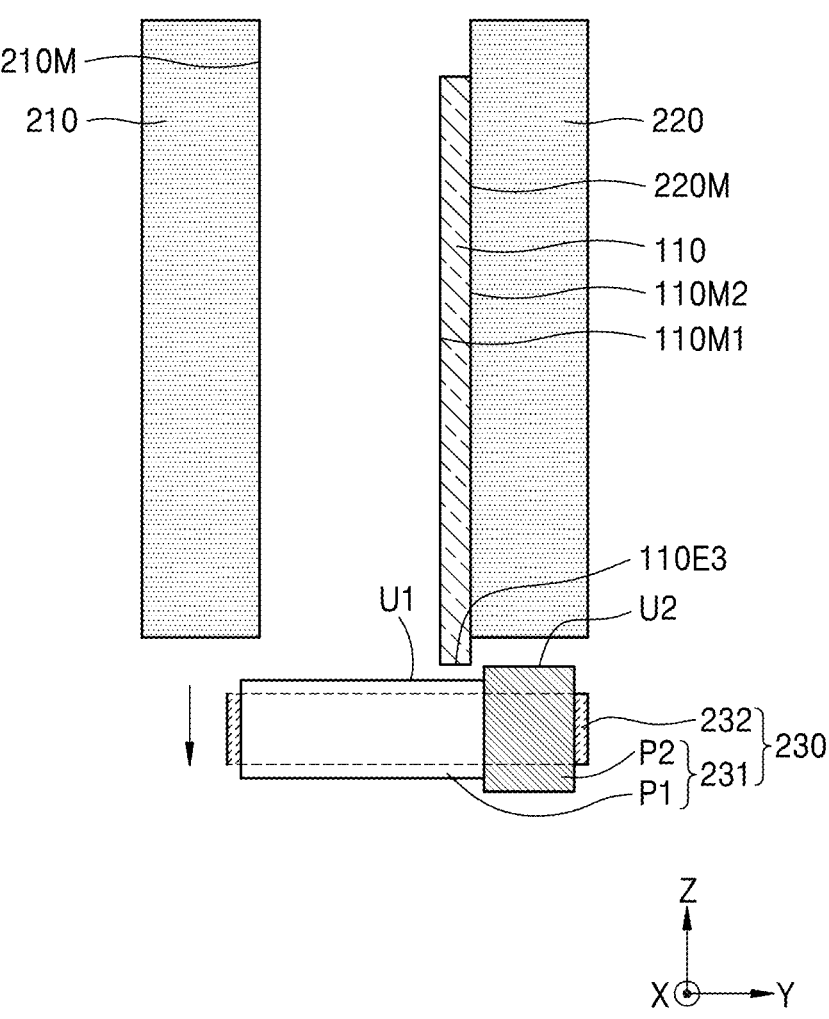
Figure 7D:
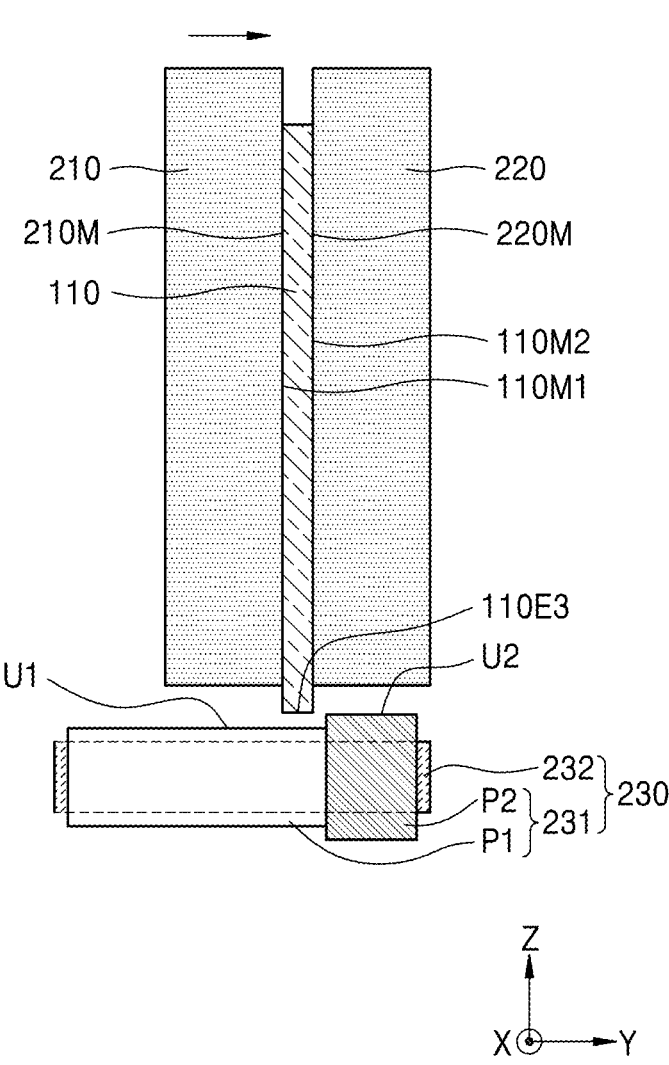
Figure 7E:
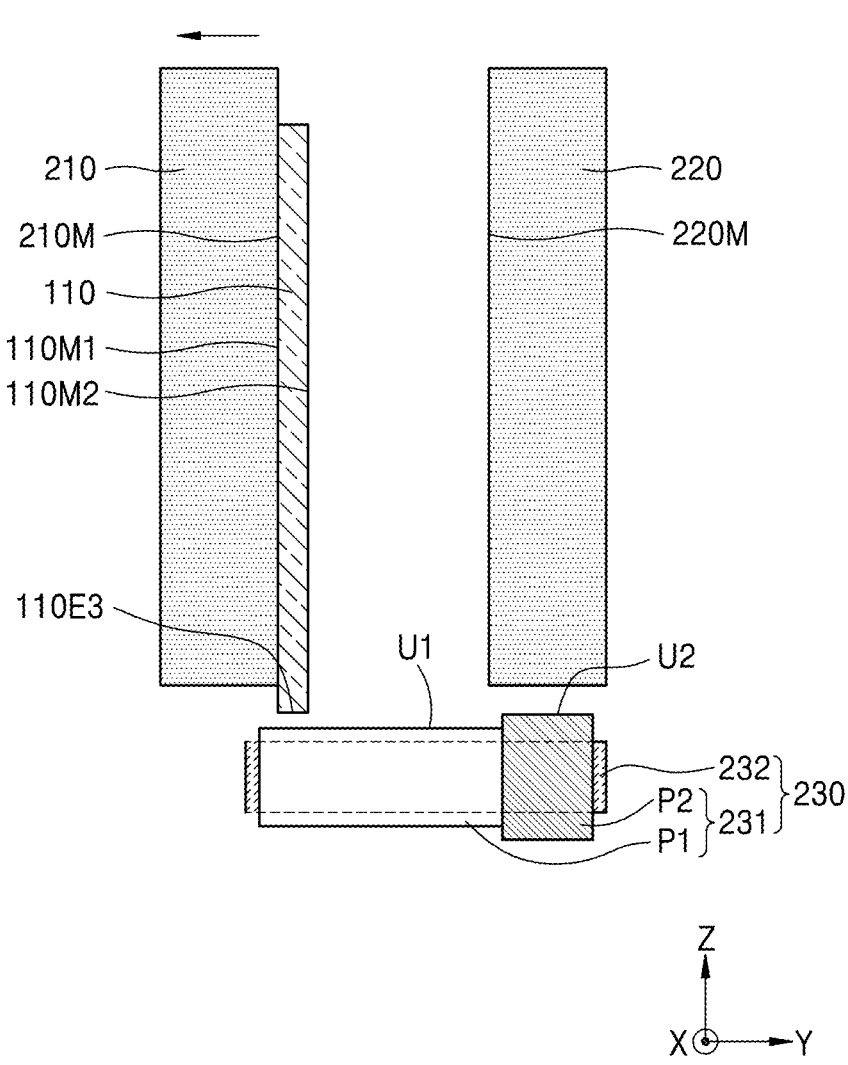
Figure 7F:
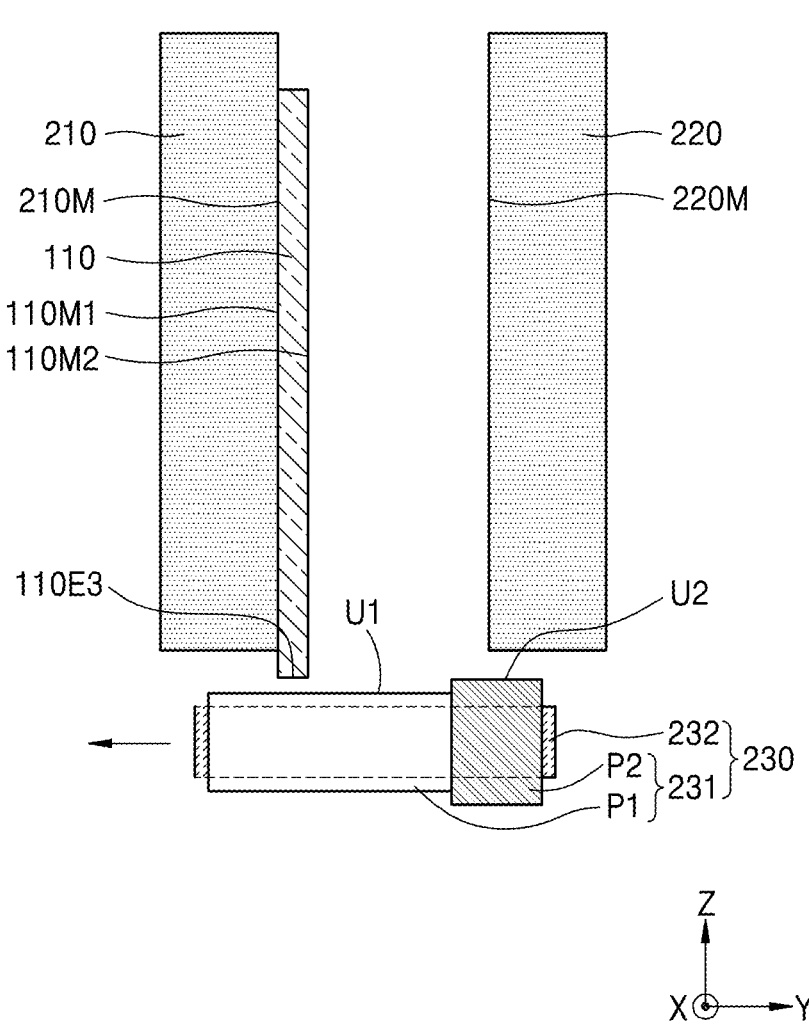
Figure 7G:
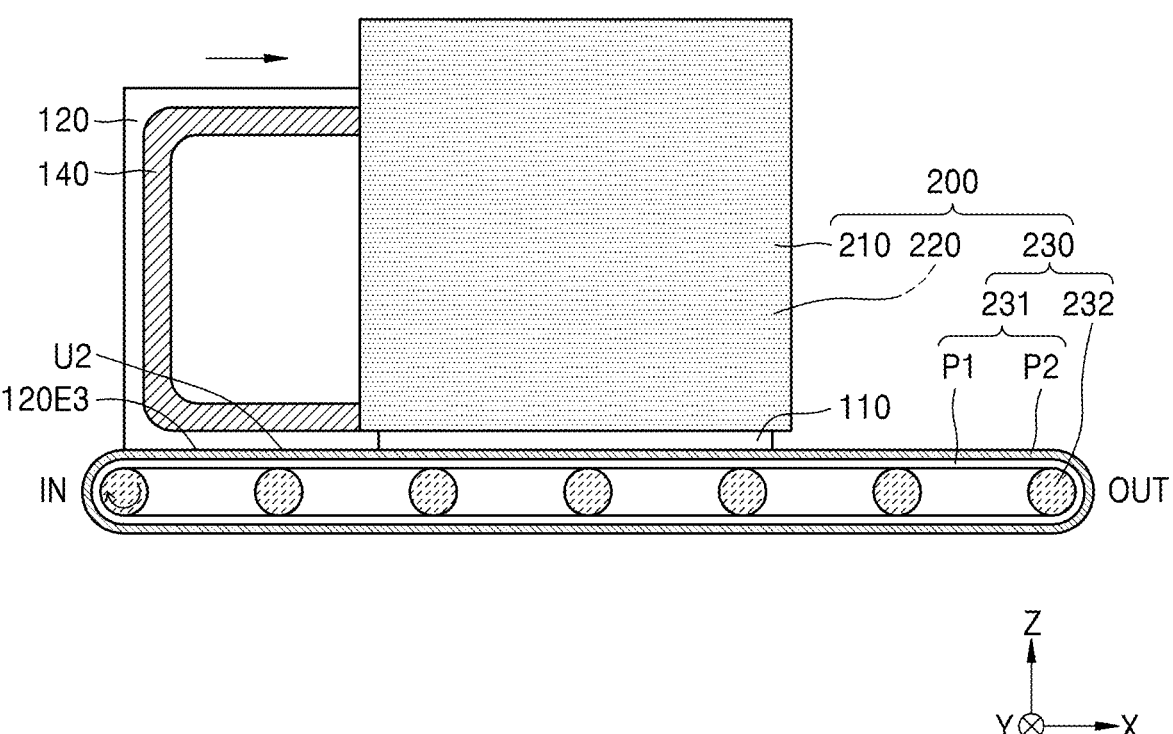
Figure 7H:
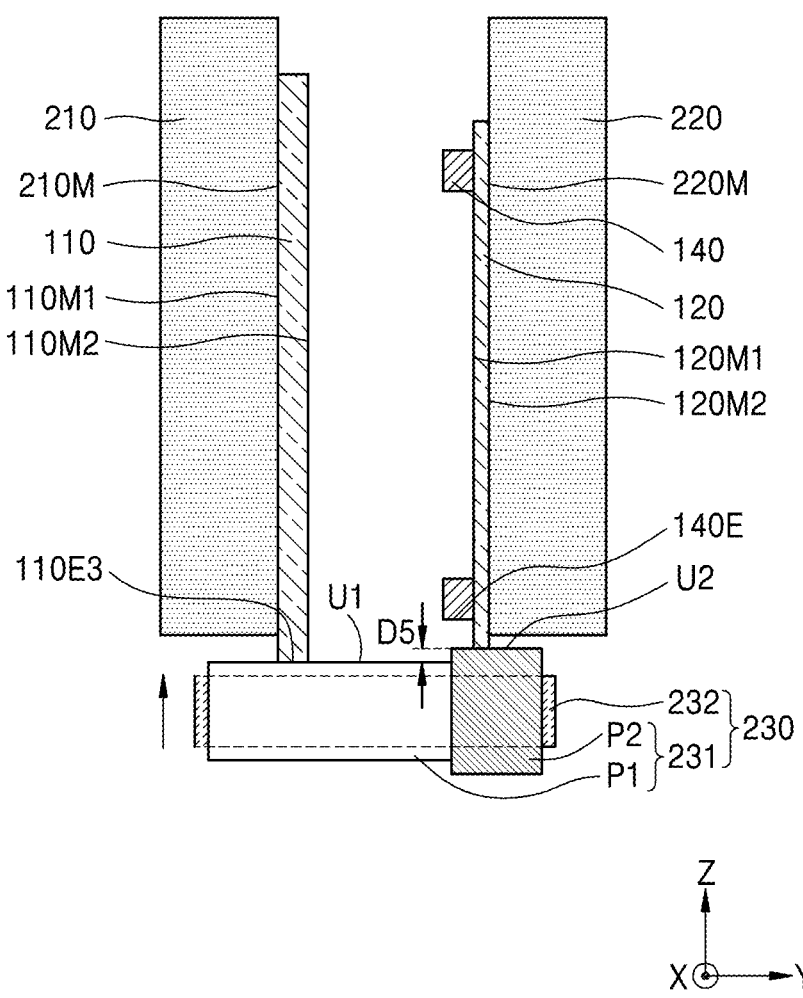
Figure 7I:
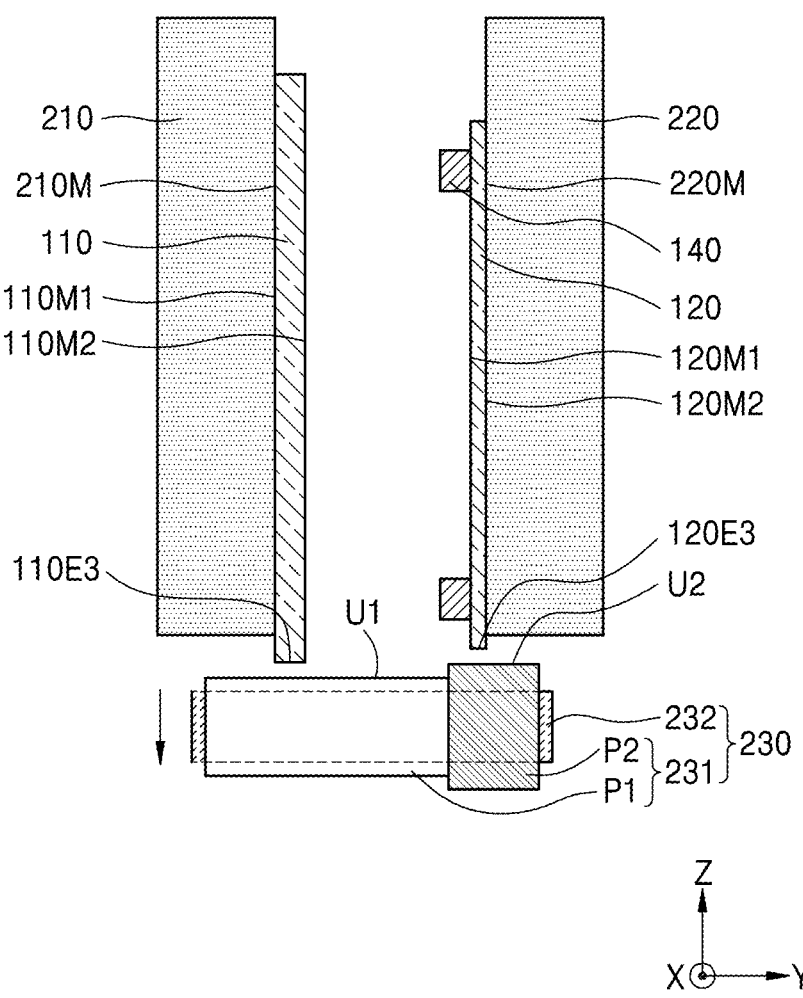
Figure 7J:
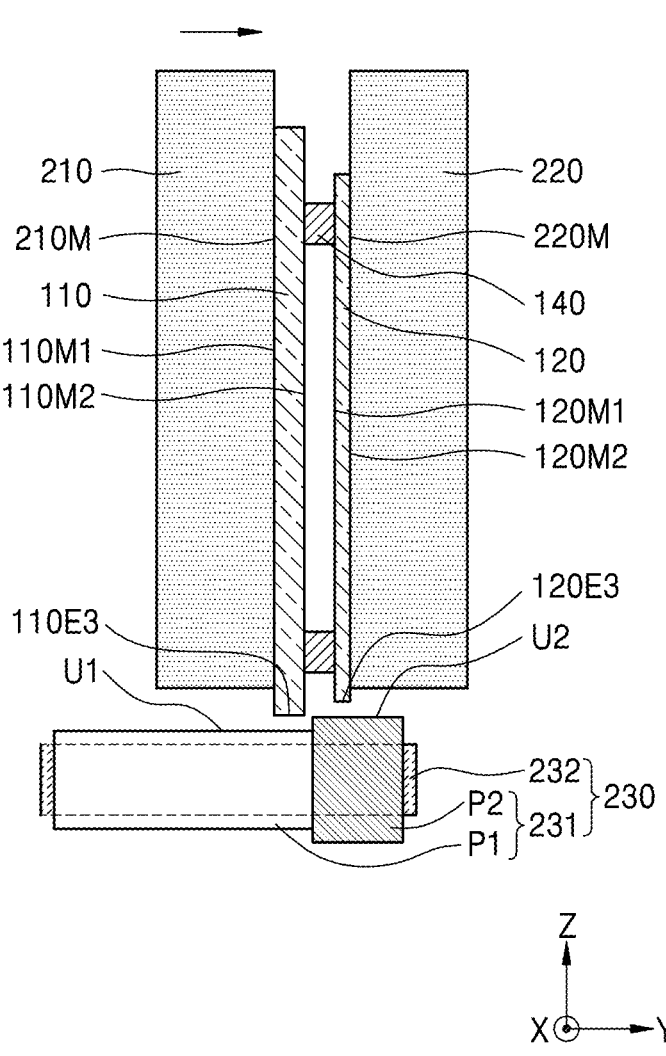
Figure 7K:
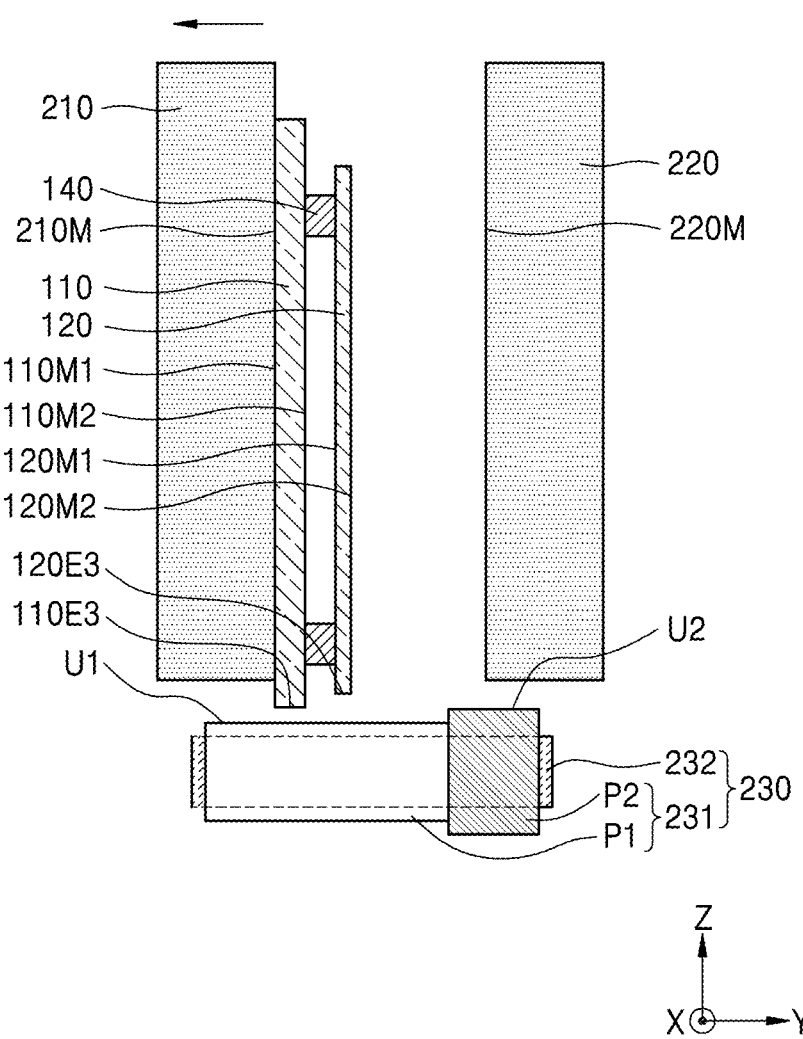
Figure 7L:
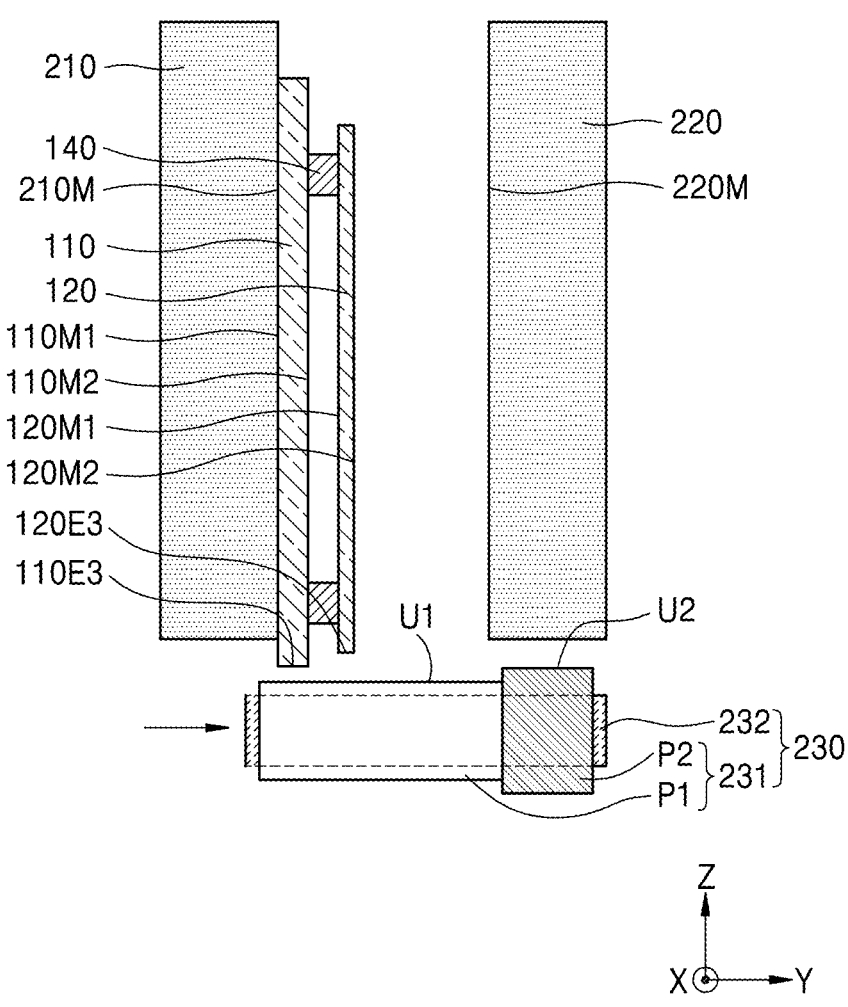
Figure 7M:
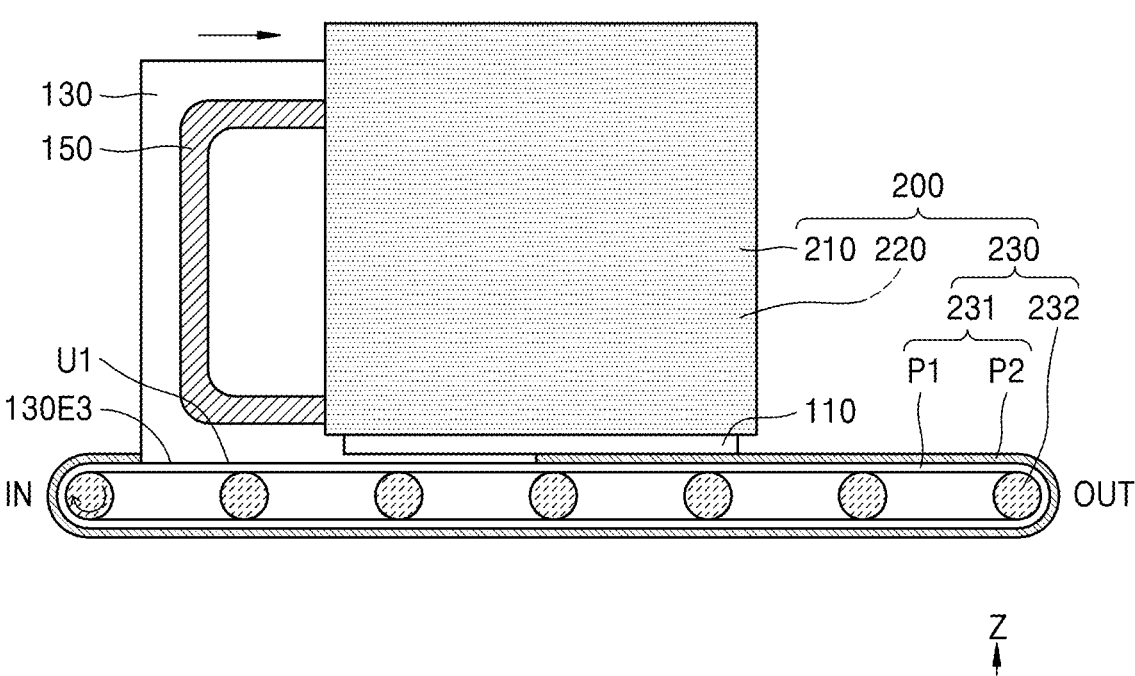
Figure 7N:
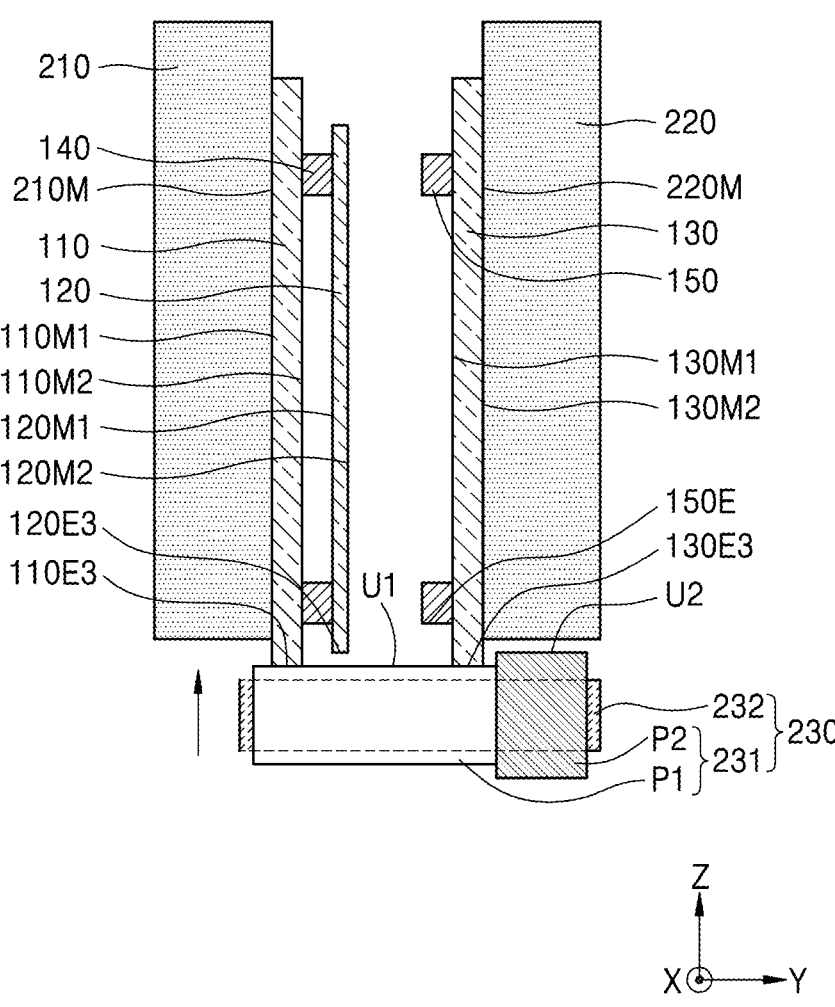
Figure 70:
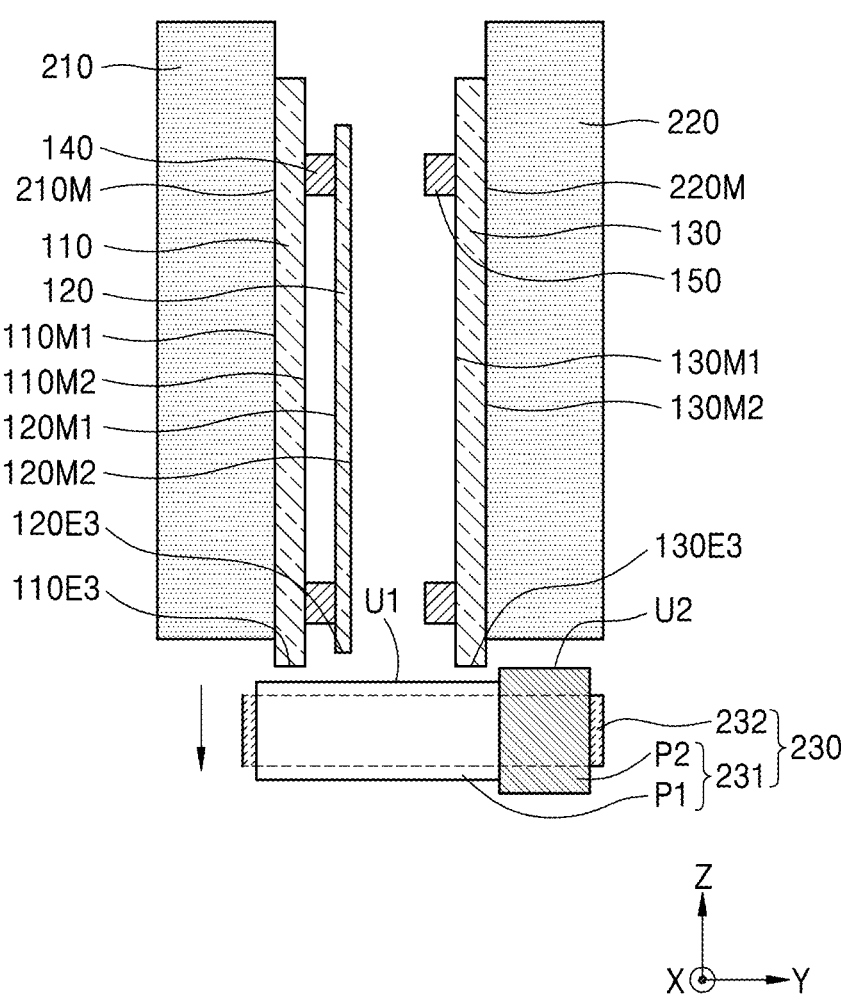
Figure 7P:
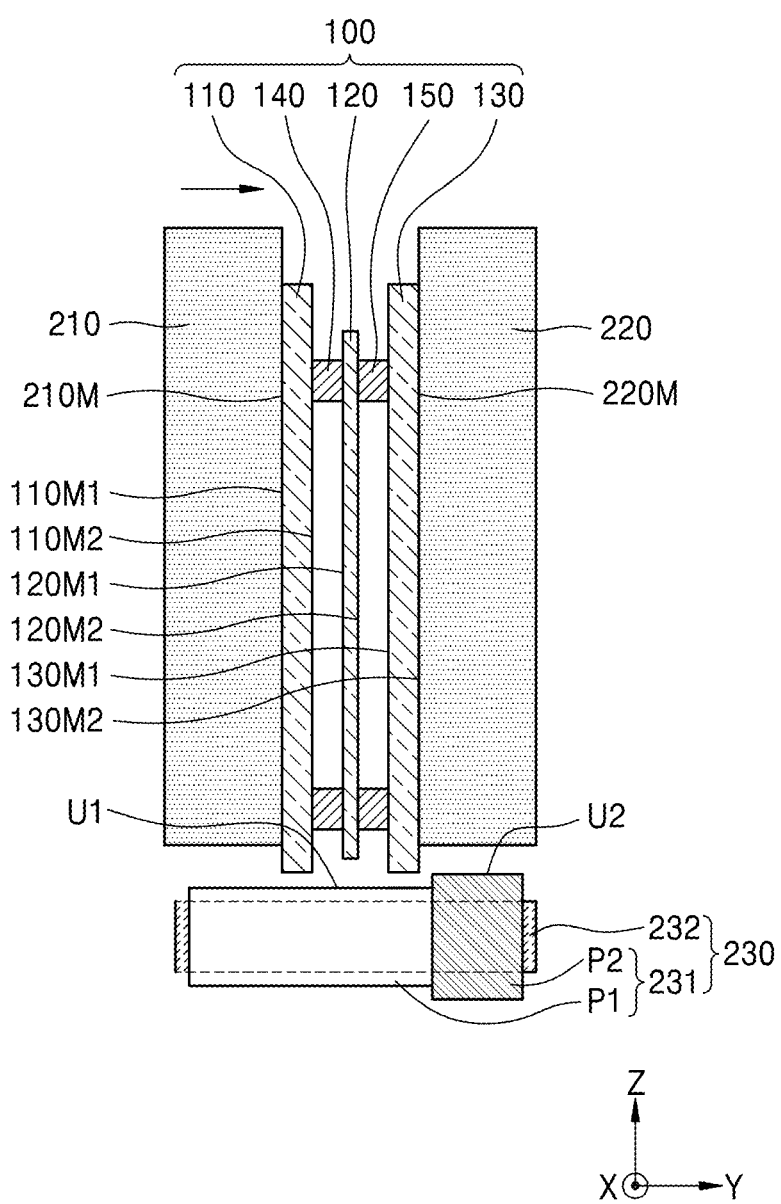
Figure 7Q:
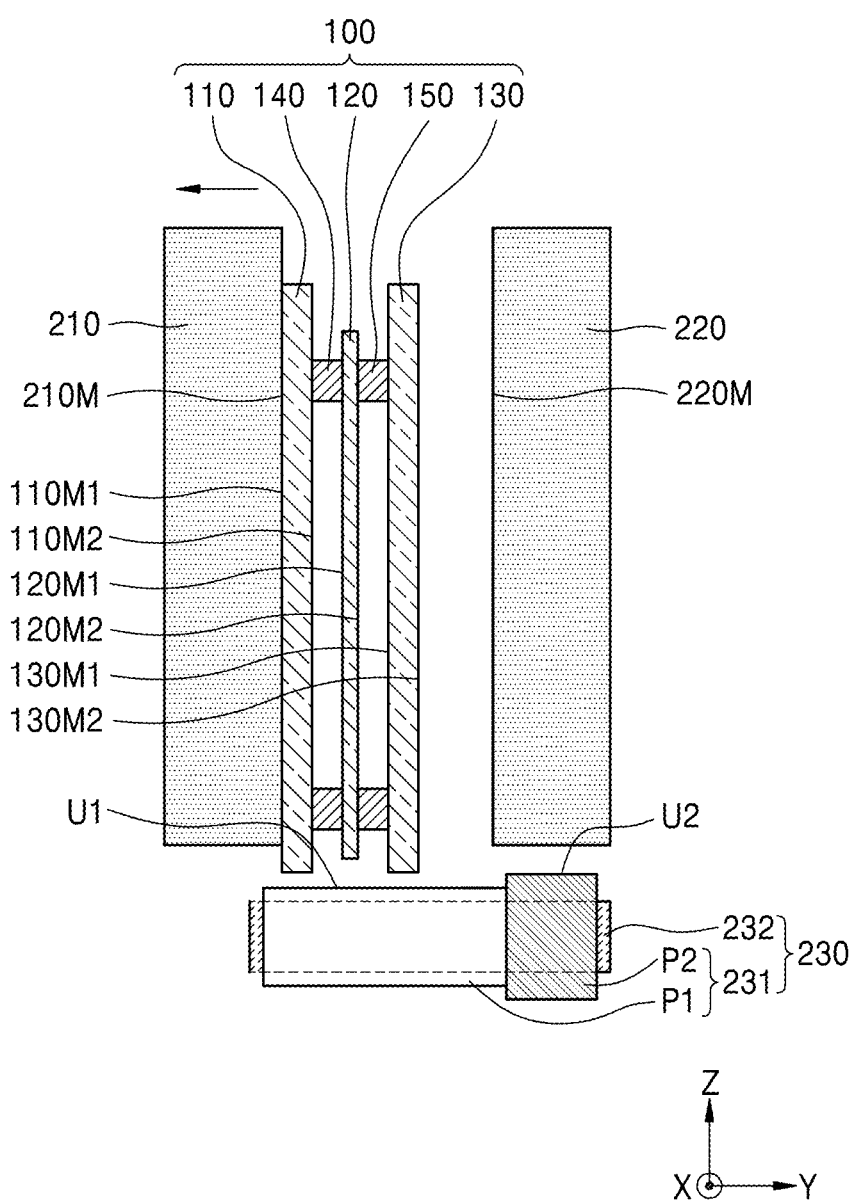
Figure 7R:
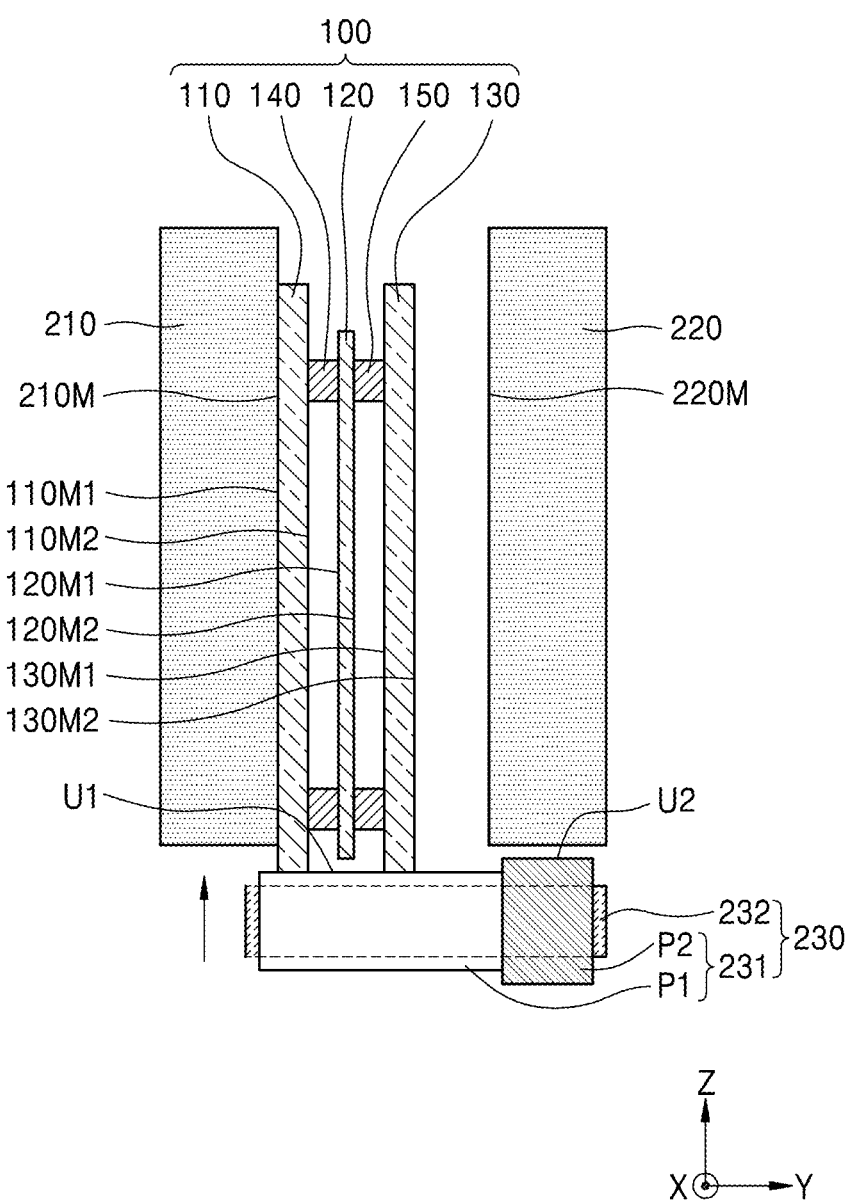
Figure 7S:
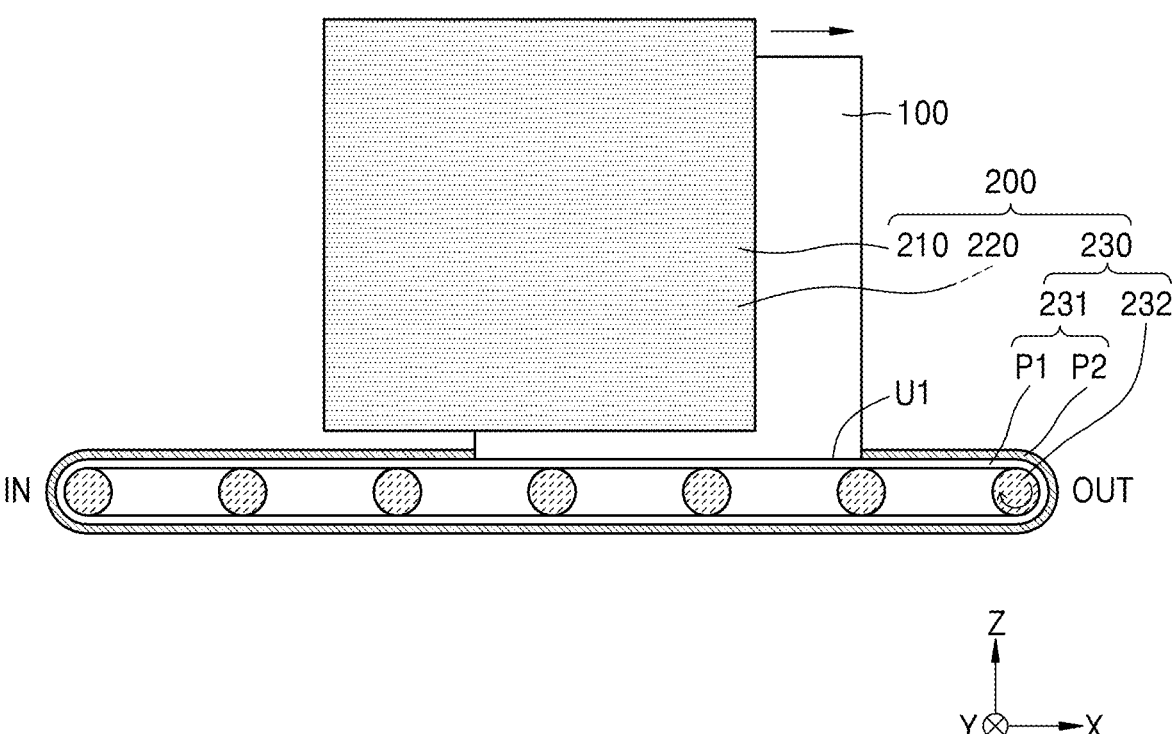

FIGS. 7A and 7S are side views for describing a method of manufacturing the multi-pane glass unit 100, according to an embodiment of the disclosure.

Referring to FIGS. 7A and 7B, the first glass pane 110 may be loaded on the first portion P1 of the conveyer 230, and the first glass pane 110 may be conveyed onto the second plate 220 by using the first portion P1 of the conveyer 230. According to some embodiments, a height of the third edge surface 110E3 of the first glass pane 110 in the vertical direction (Z direction) may be aligned by the top surface U1 of the first portion P1 of the conveyer 230. The first glass pane 110 may be held on the second plate 220. The second main surface 110M2 of the first glass pane 110 may be adhered on the surface 220M of the second plate 220.

Referring to FIG. 7C, according to some embodiments, the conveyer 230 may move downward (–Z direction) such that the first glass pane 110 is separated from the conveyer 230 in the Z direction. According to another embodiment, the moving of the conveyer 230 downward (–Z direction) may be omitted. According to another embodiment, the conveyer 230 may not move, but the first plate 210 and the second plate 220 may move upward (Z direction).

Referring to FIG. 7D, the first plate 210 may move in the Y direction. The first plate 210 may hold the first glass pane 110. The first main surface 110M1 of the first glass pane 110 may be adhered on the surface 210M of the first plate 210.

Referring to FIG. 7E, the second plate 220 may release the first glass pane 110. The first plate 210 may return to an original location by moving in a direction (−Y direction) opposite to a first horizontal direction. The second main surface 110M2 of the first glass pane 110 may be separated from the surface 220M of the second plate 220. Summarizing the operations shown in FIGS. 7A through 7E, the first glass pane 110 may be transferred from the first portion P1 of the conveyer 230 onto the first plate 210 through the second plate 220. According to another embodiment, the first glass pane 110 may be transferred directly onto the first plate 210 without using the second plate 220.

Referring to FIG. 7F, the conveyer 230 may move in the direction (−Y direction) opposite to the first horizontal direction such that the second portion P2 of the belt 231 passes below a space between the first plate 210 and the second plate 220.

Referring to FIGS. 7G and 7H, the first spacer 140 may be adhered on the first main surface 120M1 of the second glass pane 120. According to some embodiments, the first spacer 140 may be adhered on the second glass pane 120 such that the circumference 140E of the first spacer 140 is offset inward with respect to the circumference of the second glass pane 120.

The second glass pane 120 to which the first spacer 140 is adhered may be loaded on the second portion P2 of the conveyer 230, and the second glass pane 120 may be conveyed on the second plate 220 by using the second portion P2 of the conveyer 230. According to some embodiments, the conveyer 230 may move upward (Z direction) such that the height of the third edge surface 110E3 of the first glass pane 110 in the vertical direction (Z direction) is aligned by the top surface U1 of the first portion P1 of the conveyer 230. According to some embodiments, a height of the third edge surface 120E3 of the second glass pane 120 in the vertical direction (Z direction) may be aligned by the top surface U2 of the second portion P2 of the conveyer 230. Because the top surface U2 of the second portion P2 of the conveyer 230 is offset in the Z direction with respect to the top surface U1 of the first portion P1 of the conveyer 230, the third edge surface 120E3 of the second glass pane 120 adjacent to the second portion P2 of the conveyer 230 may be located higher than the third edge surface 110E3 of the first glass pane 110 adjacent to the first portion P1 of the conveyer 230 in the Z direction. The distance D5 by which the top surface U2 of the second portion P2 of the conveyer 230 is offset with respect to the top surface U1 of the first portion P1 of the conveyer 230 may be adjusted such that the circumference of the second glass pane 120 is offset inward with respect from the circumference of the first glass pane 110. The second glass pane 120 may be held on the second plate 220 such that the first main surface 120M1 of the second glass pane 120 to which the first spacer 140 is adhered faces the first glass pane 110. The second main surface 120M2 of the second glass pane 120 may be adhered on the surface 220M of the second plate 220.

Referring to FIG. 7I, according to some embodiments, the conveyer 230 may move downward (−Z direction) such that the first glass pane 110 and the second glass pane 120 are separated from the conveyer 230 in the Z direction. According to another embodiment, the moving of the conveyer 230 downward (−Z direction) may be omitted. According to another embodiment, the conveyer 230 may not move, but the first plate 210 and the second plate 220 may move upward (Z direction).

Referring to FIG. 7J, at least one of the first plate 210 and the second plate 220 may move such that the first glass pane 110 is adhered to the second glass pane 120 via the first spacer 140. For example, the first plate 210 may move in the Y direction.

Referring to FIG. 7K, the second plate 220 may release the second glass pane 120. The first plate 210 may return to the original location by moving in the direction (−Y direction) opposite to the first horizontal direction. The second main surface 120M2 of the second glass pane 120 may be separated from the surface 220M of the second plate 220. According to some embodiments, an additional second glass pane (not shown) to which an additional spacer (not shown) is adhered may be conveyed on the second plate 220 by the second portion P2 of the conveyer 230, the additional second glass pane may be held on the second plate 220, at least one of the first plate 210 and the second plate 220, for example, the first plate 210, may move in the Y direction such that the second glass pane 120 is adhered to the additional second glass pane through the additional spacer, the second plate 220 may release the additional second glass pane, and the first plate 210 may move in the direction (−Y direction) opposite to the first horizontal direction to return to the original location.

Referring to FIG. 7L, the conveyer 230 may move in the Y direction such that the first portion P1 of the belt 231 passes below the space between the first plate 210 and the second plate 220.

Referring to FIGS. 7M and 7N, the second spacer 150 may be adhered on the first main surface 130M1 of the third glass pane 130. According to some embodiments, the second spacer 150 may be adhered on the third glass pane 130 such that the circumference 150E of the second spacer 150 is offset inward with respect to the circumference of the third glass pane 130 and the circumference of the second glass pane 120.

The third glass pane 130 to which the second spacer 150 is adhered may be loaded on the first portion P1 of the conveyer 230, and the third glass pane 130 may be conveyed on the second plate 220 by using the first portion P1 of the conveyer 230. According to some embodiments, the conveyer 230 may move upward (Z direction) such that height of the third edge surface 110E3 of the first glass pane 110 in the vertical direction (Z direction) is aligned by the top surface U1 of the first portion P1 of the conveyer 230. According to some embodiments, a height of the third edge surface 130E3 of the third glass pane 130 in the vertical direction (Z direction) may be aligned by the top surface U1 of the first portion P1 of the conveyer 230. Accordingly, the third edge surface 110E3 of the first glass pane 110 and the third edge surface 130E3 of the third glass pane 130 may be aligned at the same height in the Z direction, and the third edge surface 120E3 of the second glass pane 120 may be aligned higher than the third edge surface 110E3 of the first glass pane 110 and the third edge surface 130E3 of the third glass pane 130 in the Z direction. The circumference of the second glass pane 120 may be offset inward with respect to the circumference of the first glass pane 110 and the circumference of the third glass pane 130.

The third glass pane 130 may be held on the second plate 220 such that the first main surface 130M1 of the third glass pane 130 to which the second spacer 150 is adhered faces the second glass pane 120. The second main surface 130M2 of the third glass pane 130 may be adhered on the surface 220M of the second plate 220.

Referring to FIG. 7O, according to some embodiments, the conveyer 230 may move downward (−Z direction) such that the first glass pane 110 and the third glass pane 130 are separated from the conveyer 230 in the Z direction. According to another embodiment, the moving of the conveyer 230 downward (−Z direction) may be omitted. According to another embodiment, the conveyer 230 may not move, but the first plate 210 and the second plate 220 may move upward (Z direction).

Referring to FIG. 7P, at least one of the first plate 210 and the second plate 220 may move such that the second glass pane 120 is adhered to the third glass pane 130 through the second spacer 150. For example, the first plate 210 may move in the Y direction.

Referring to FIG. 7Q, the second plate 220 may release the third glass pane 130. The first plate 210 may return to the original location by moving in the direction (−Y direction) opposite to the first horizontal direction. The second main surface 130M2 of the third glass pane 130 may be separated from the surface 220M of the second plate 220. As such, the multi-pane glass unit 100 shown in FIGS. 1A through 1C may be easily manufactured.

Referring to FIGS. 7R through 7S, the conveyer 230 may move upward (Z direction) such that the multi-pane glass unit 100 is loaded on the first portion P1 of the conveyer 230. The first plate 210 may release the multi-pane glass unit 100 on the first portion P1 of the conveyer 230. The first main surface 110M1 of the first glass pane 110 may be separated from the surface 210M of the first plate 210. The first portion P1 of the conveyer 230 may convey the multi-pane glass unit 100 in the X direction.

Figure 8:
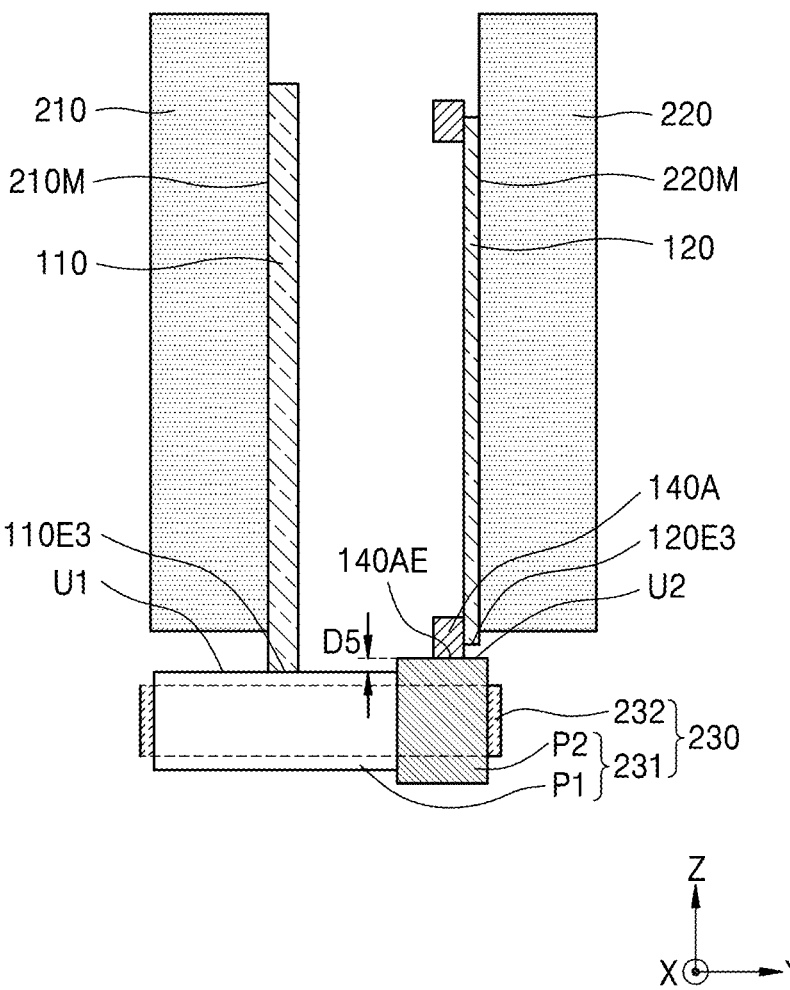
FIG. 8 is a side view showing one of operations of a method of manufacturing a multi-pane glass unit, according to an embodiment of the disclosure.

FIG. 8 is a side view showing one of operations of a method of manufacturing a multi-pane glass unit, according to an embodiment of the disclosure. Hereinafter, a difference between an operation shown in FIG. 7H and an operation shown in FIG. 8 will be described.

Referring to FIG. 8, the first spacer 140A may be adhered on the second glass pane 120 such that the circumference 140AE of the first spacer 140A is offset outward with respect to the circumference of the second glass pane 120. The height of the third edge surface 110E3 of the first glass pane 110 in the vertical direction (Z direction) may be aligned by the top surface U1 of the first portion P1 of the conveyer 230, and the height of the circumference 140AE of the first spacer 140A in the vertical direction (Z direction) may be aligned by the top surface U2 of the second portion P2 of the conveyer 230. Because the top surface U2 of the second portion P2 of the conveyer 230 is offset with respect to the top surface U1 of the first portion P1 of the conveyer 230 in the Z direction, the circumference 140AE of the first spacer 140 may be located higher than the third edge surface 110E3 of the first glass pane 110 adjacent to the first portion P1 of the conveyer 230 in the Z direction. The distance D5 by which the top surface U2 of the second portion P2 of the conveyer 230 is offset with respect to the top surface U1 of the first portion P1 of the conveyer 230 may be adjusted such that the circumference 140AE of the first spacer 140A is offset inward with respect to the circumference of the first glass pane 110. By replacing the operation shown in FIG. 7H with the operation shown in FIG. 8, the multi-pane glass unit 100A of FIGS. 2A through 2C, the multi-pane glass unit 100B of FIG. 3, or the multi-pane glass unit 100C of FIG. 4 may be manufactured.

Figure 9:
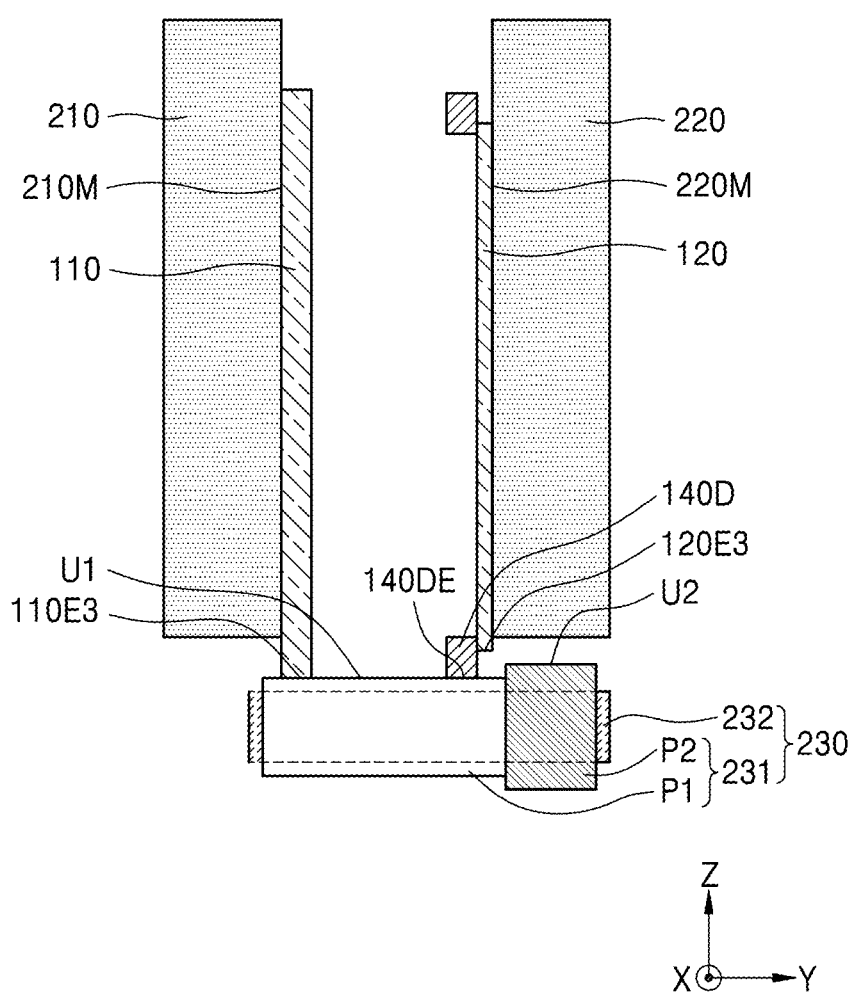
FIG. 9 is a side view showing one of operations of a method of manufacturing a multi-pane glass unit, according to an embodiment of the disclosure.

FIG. 9 is a side view showing one of operations of a method of manufacturing a multi-pane glass unit, according to an embodiment of the disclosure. Hereinafter, a difference between an operation shown in FIG. 8 and an operation shown in FIG. 9 will be described.

Referring to FIG. 9, the second glass pane 120 to which the first spacer 140D is adhered may be conveyed by the first portion P1 of the conveyer 230. The height of the third edge surface 110E3 of the first glass pane 110 in the vertical direction (Z direction) and the height of the circumference 140DE of the first spacer 140D in the vertical direction (Z direction) may be aligned by the top surface U1 of the first portion P1 of the conveyer 230. Accordingly, the third edge surface 110E3 of the first glass pane 110 and the circumference 140DE of the first spacer 140D may be located at the same height in the Z direction. In other words, the circumference 140DE of the first spacer 140D may be aligned with the circumference of the first glass pane 110 in the Y direction. However, because the first spacer 140D is adhered on the second glass pane 120 such that the circumference 140DE of the first spacer 140D is offset outward with respect to the circumference of the second glass pane 120, the circumference of the second glass pane 120 may still be offset inward with respect to the circumference of the first glass pane 110. By replacing the operation shown in FIG. 8 with the operation shown in FIG. 9, the multi-pane glass unit 100D of FIGS. 5A through 5C may be manufactured.

Figure 10:
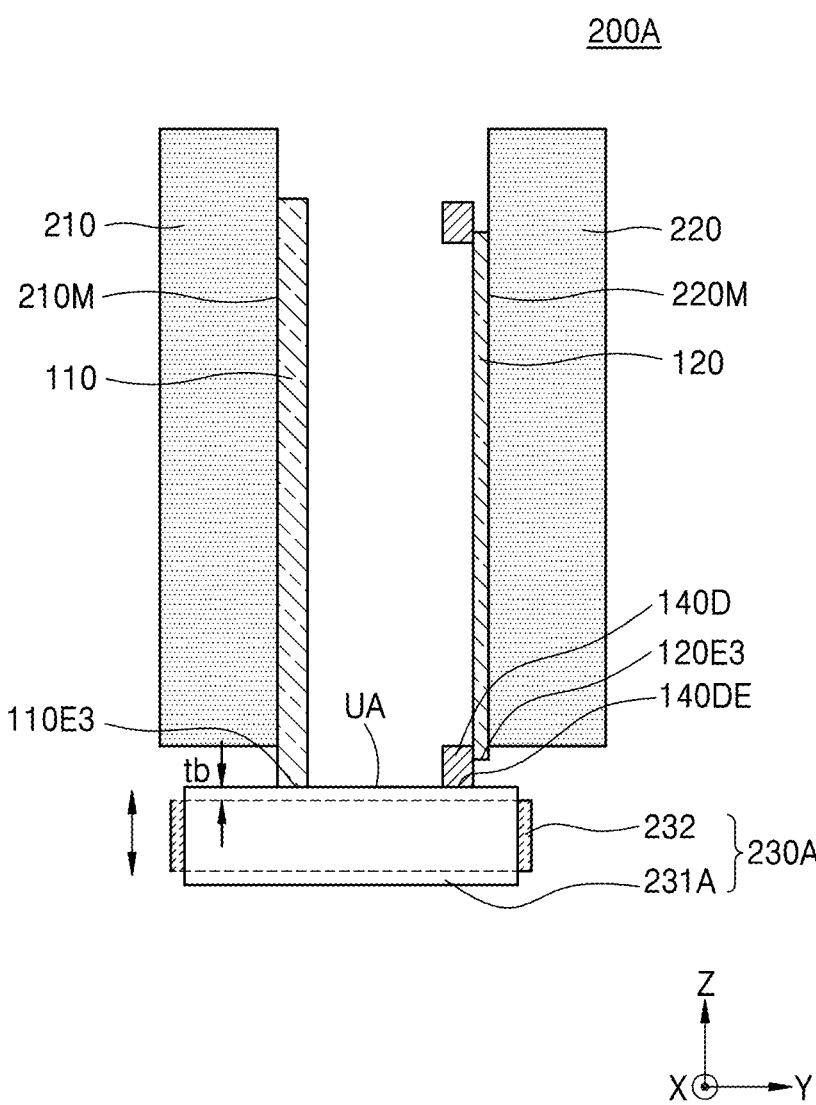
FIG. 10 is a side view showing one of operations of a method of manufacturing a multi-pane glass unit, according to an embodiment of the disclosure.
Figure 11A:
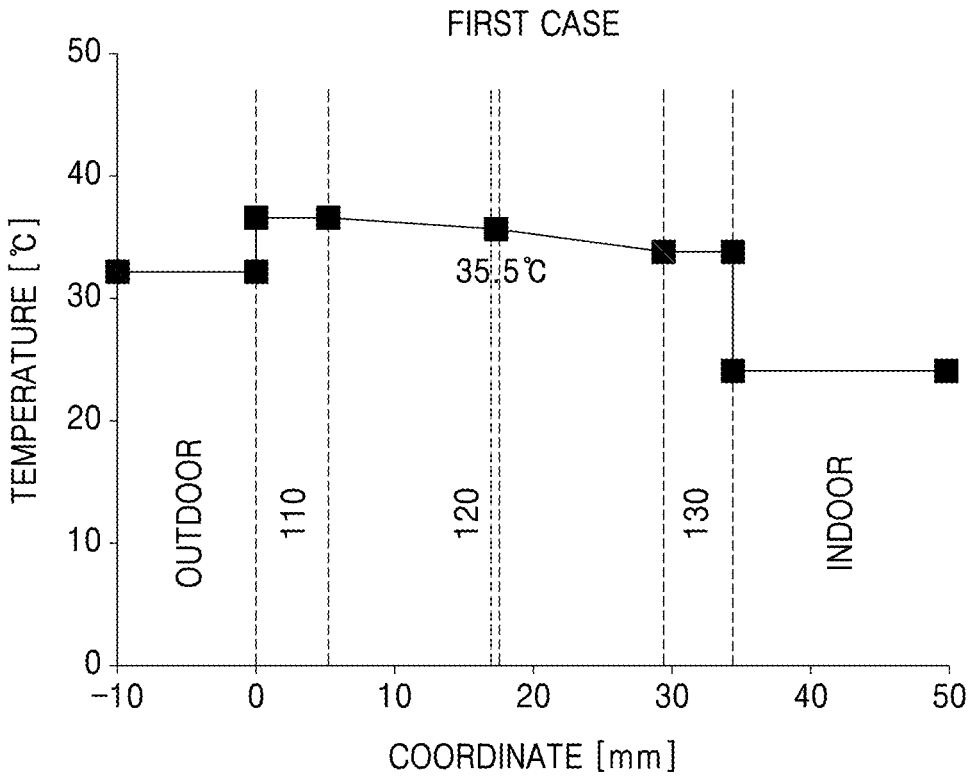
FIGS. 11A through 11F show temperature profile simulation results of first through sixth cases when exposed to sunlight, respectively.
Figure 11B:
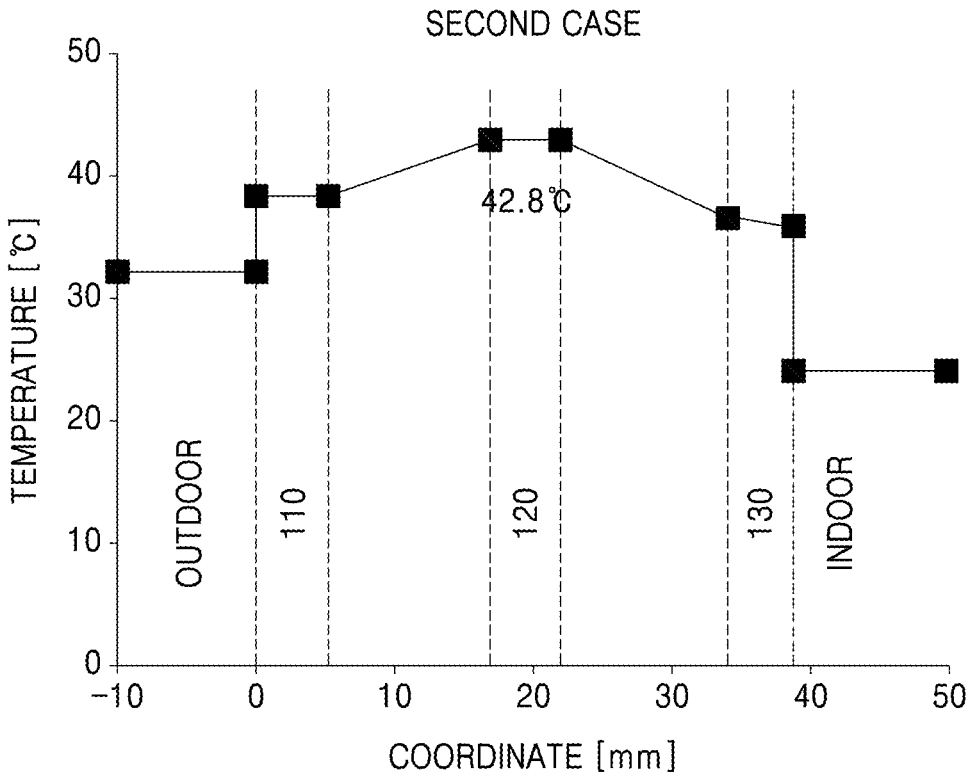
Figure 11C:
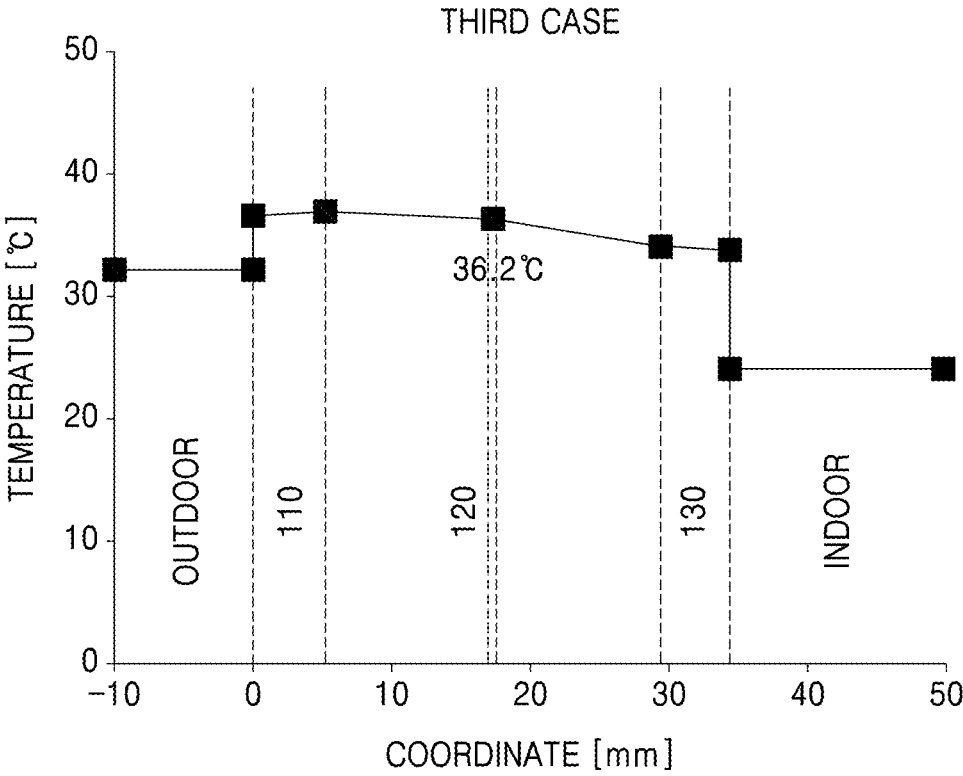
Figure 11D:
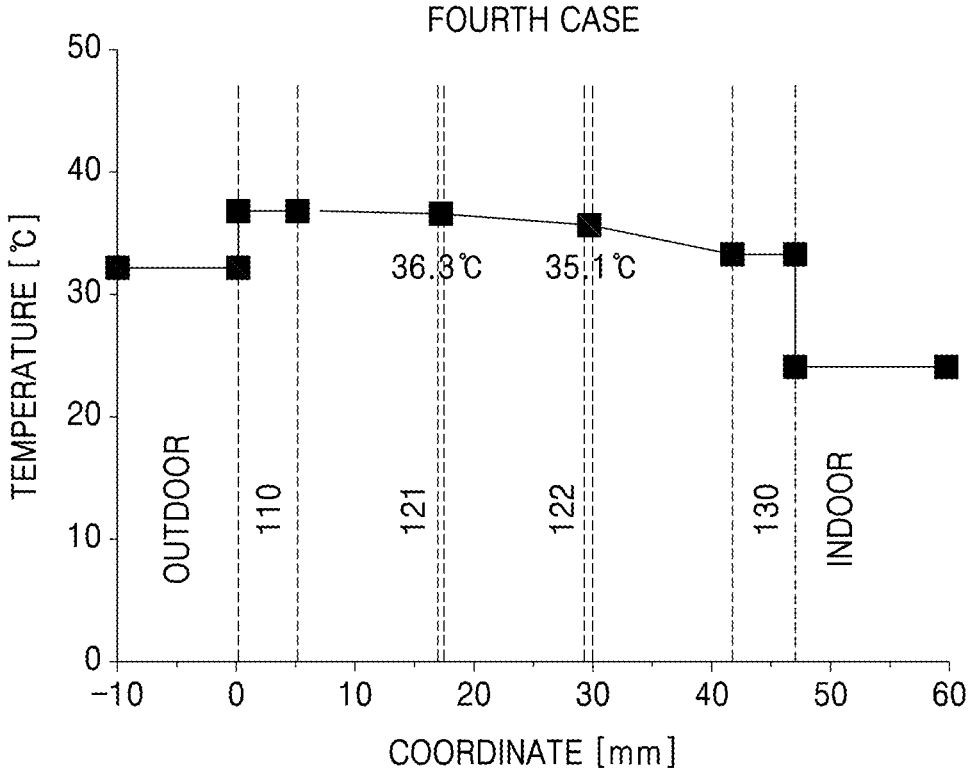
Figure 11E:
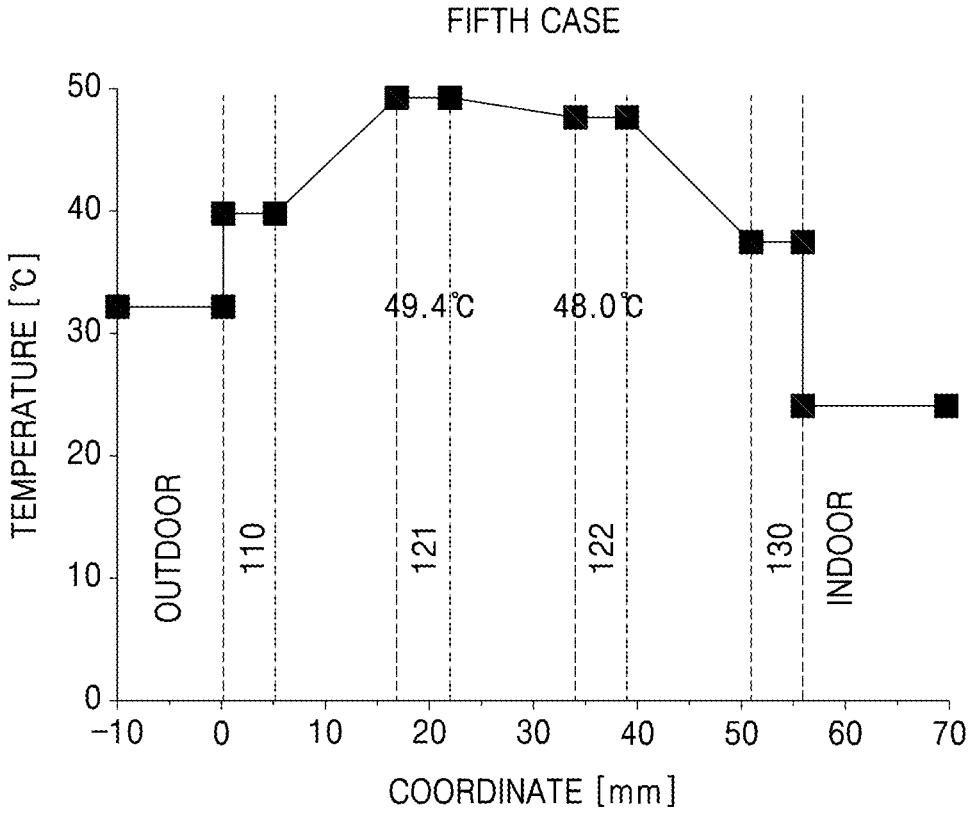
Figure 11F:
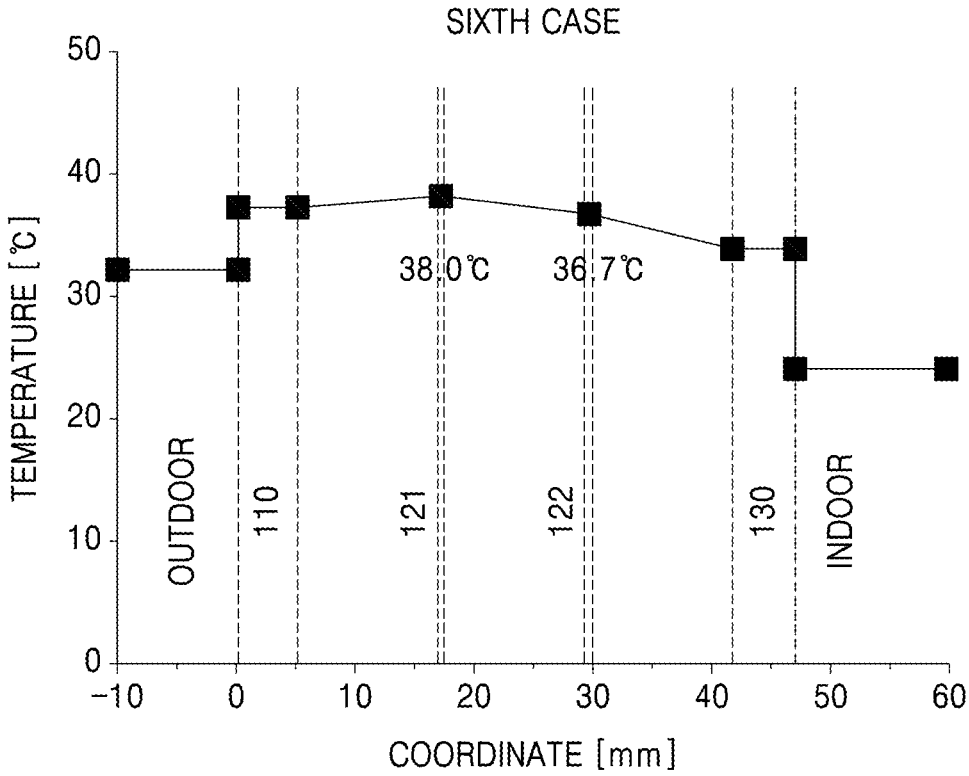

FIG. 10 is a side view showing one of operations of a method of manufacturing a multi-pane glass unit, according to an embodiment of the disclosure. Hereinafter, a difference between an operation shown in FIG. 9 and an operation shown in FIG. 10 will be described.

Referring to FIG. 10, the multi-pane glass unit 100D of FIGS. 5A through 5C may be manufactured by using an apparatus 200A for manufacturing a multi-pane glass unit. A height of a belt 231A of a conveyer 230A of the apparatus 200A in a vertical direction (Z direction) may be substantially uniform. For example, a thickness tb of the belt 231A may be substantially uniform. In other words, the belt 231A of the conveyer 230A of the apparatus 200A may not include the second portion P2 of the belt 231 of the conveyer 230 of the apparatus 200 shown in FIGS. 6A and 6B. The conveyer 230A may be movable in the Z direction, but may not be movable in a Y direction. The height of the third edge surface 110E3 of the first glass pane 110 in the vertical direction (Z direction) and the height of the circumference 140DE of the first spacer 140D in the vertical direction (Z direction) may be aligned by a top surface UA of the conveyer 230A. Accordingly, the third edge surface 110E3 of the first glass pane 110 and the circumference 140DE of the first spacer 140D may be located at the same height in the Z direction. In other words, the circumference 140DE of the first spacer 140D may be aligned with the circumference of the first glass pane 110 in the Y direction. However, because the first spacer 140D is adhered on the second glass pane 120 such that the circumference 140DE of the first spacer 140D is offset outward with respect to the circumference of the second glass pane 120, the circumference of the second glass pane 120 may still be offset inward with respect to the circumference of the first glass pane 110.

Hereinafter, the disclosure will be described in more detail by using six cases organized in Table 3 below.

TABLE 3

| | | Type of Glass | Thickness of Glass (mm) |
|---|---|---|---|
| First Case (First Example) | First Glass Pane | Soda Lime | 5 |
| | Internal Glass Pane (Second Glass Pane) | Boroaluminosilicate | 0.5 |
| | Third Glass Pane | Soda Lime | 5 |
| Second Case (First Comparative Example) | First Glass Pane | Soda Lime | 5 |
| | Internal Glass Pane (Second Glass Pane) | Soda Lime | 5 |
| | Third Glass Pane | Soda Lime | 5 |
| Third Case (Second Comparative Example) | First Glass Pane | Soda Lime | 5 |
| | Internal Glass Pane (Second Glass Pane) | Soda Lime | 0.5 |
| | Third Glass Pane | Soda Lime | 5 |
| Fourth Case (Second Example) | First Glass Pane | Soda Lime | 5 |
| | First Internal Glass Pane | Boroaluminosilicate | 0.5 |
| | Second Internal Glass Pane | Boroaluminosilicate | 0.5 |
| | Third Glass Pane | Soda Lime | 5 |
| Fifth Case (Third Comparative Example) | First Glass Pane | Soda Lime | 5 |
| | First Internal Glass Pane | Soda Lime | 5 |
| | Second Internal Glass Pane | Soda Lime | 5 |
| | Third Glass Pane | Soda Lime | 5 |
| Sixth Case (Fourth Comparative Example) | First Glass Pane | Soda Lime | 5 |
| | First Internal Glass Pane | Soda Lime | 0.5 |
| | Second Internal Glass Pane | Soda Lime | 0.5 |
| | Third Glass Pane | Soda Lime | 5 |

Table 4 below shows simulation results of sunlight transmittance and visible light transmittance of the first through sixth cases.

TABLE 4

| | Sunlight transmittance (%) | Visible light transmittance (%) |
|---|---|---|
| First Case (First Example) | 62.7 | 74.9 |
| Second Case (First Comparative Example) | 56.4 | 72.8 |
| Third Case (Second Comparative Example) | 62.3 | 74.2 |
| Fourth Case (Second Example) | 58.5 | 69.9 |
| Fifth Case (Third Comparative Example) | 47.6 | 66.1 |
| Sixth Case (Fourth Comparative Example) | 57.5 | 68.5 |

Referring to Table 4, the first case (first example) has higher sunlight transmittance and visible light transmittance than the second case (first comparative example) and the third case (second comparative example), and the fourth case (second example) has higher sunlight transmittance and visible light transmittance than the fifth case (third comparative example) and the sixth case (fourth comparative example). In other words, it is determined that multi-pane glass units according to embodiments of the disclosure have increased sunlight transmittance and visible light transmittance by employing a thin boroaluminosilicate glass pane instead of an existing thick soda lime glass pane as a second glass pane. Thus, the multi-pane glass units according to embodiments of the disclosure may be further transparent.

FIGS. 11A through 11F show temperature profile simulation results of the first through sixth cases when exposed to sunlight, respectively.

Referring to FIGS. 11A through 11F, a temperature of the internal glass pane (second glass pane) 120 is lower in the first case (first example) than in the second case (first comparative example) and the third case (second comparative example), and temperatures of the internal glass panes 121 and 122 are lower in the fourth case (second example) than in the fifth case (third comparative example) and the sixth case (fourth comparative example). In other words, when the multi-pane glass units according to embodiments of the disclosure are exposed to the sunlight, a temperature rise of the second glass pane is low, and thus thermal breakage of the second glass pane may be less likely to occur.

Table 5 below shows simulation results of a temperature difference between a center and edge of the second glass pane in the first through third cases and maximum principal stress formed in the second glass pane due to the temperature difference.

TABLE 5

| | Temperature Difference((° C.) | Maximum Principal Stress (MPa) |
|---|---|---|
| First Case (First Example) | 1.76 | 0.441 |
| Second Case (First Comparative Example) | 6.54 | 3.74 |
| Third Case (Second Comparative Example) | 2.34 | 1.33 |

Referring to Table 5, the temperature difference and the maximum principal stress of the first case (first example) are less than those of the second case (first comparative example) and the third case (second comparative example). Thus, a risk of thermal breakage is lower in the first case (first example) than in the second case (first comparative example) and the third case (second comparative example). In other words, the multi-pane glass units according to embodiments of the disclosure have a low risk of thermal breakage by employing the thin boroaluminosilicate glass pane instead of the thick soda lime glass pane as the second glass pane.

The embodiments in the disclosure are not intended to limit the technical ideas of the disclosure but to describe the disclosure, and the scope of the technical ideas of the disclosure is not limited by these embodiments. The scope of protection of the disclosure should be interpreted by the following claims, and all technical ideas within the scope equivalent thereto should be construed as being included in the scope of the disclosure.

What is claimed is:

1. An apparatus for manufacturing a multi-pane glass unit, the apparatus comprising:

a first plate and a second plate spaced apart from the first plate in a first direction, at least one of the first plate and the second plate configured to move relative to the other in the first direction;

a conveyer configured to (i) run in a second direction that is not parallel to the first direction and (ii) pass above or below a press space between the first plate and the second plate, the conveyor having a surface configured to position a first edge surface of a first glass pane and a second edge surface of a second glass pane, wherein the conveyor is configured to move the surface in a third direction to position the second edge surface closer to the press space in the third direction than the first edge surface, the third direction orthogonal to the first direction and the second direction, and a height of the surface of the conveyor in the third direction is substantially uniform across an entirety of the surface in the first direction.

2. The apparatus of claim 1, wherein the conveyor does not move in the first direction.

3. The apparatus of claim 1, wherein the surface of the conveyor is a single, contiguous surface that positions both the first edge surface of the first glass pane and the second edge surface of the second glass pane.

4. The apparatus of claim 1, wherein the conveyor is configured to move the surface of the conveyor in a direction opposite the third direction to position a third edge surface of a third glass pane to be about the same in the third direction relative to the press space as the first edge surface of the first glass pane.

5. The apparatus of claim 1, wherein one or more of the first plate and the second plate is configured to temporarily hold and release one or more of the first glass pane, the second glass pane, and the third glass pane.

6. An apparatus for manufacturing a multi-pane glass unit, the apparatus comprising:

a first plate and a second plate spaced apart from the first plate in a first direction, at least one of the first plate and the second plate configured to move relative to the other in the first direction;

a conveyer configured to (i) run in a second direction that is not parallel to the first direction and (ii) pass above or below a press space between the first plate and the second plate, the conveyor having a surface configured to position a first edge surface of a first glass pane and a second edge surface of a second glass pane, wherein the conveyor is configured to move the surface in a third direction to position the second edge surface closer to the press space in the third direction than the first edge surface, the third direction orthogonal to the first direction and the second direction, and the conveyor does not move in the first direction.

7. The apparatus of claim 6, wherein the conveyor is configured to move the surface of the conveyor in a direction opposite the third direction to position a third edge surface of a third glass pane to be about the same in the third direction relative to the press space as the first edge surface of the first glass pane.

8. The apparatus of claim 6, wherein one or more of the first plate and the second plate is configured to temporarily hold and release one or more of the first glass pane, the second glass pane, and the third glass pane.

\* \* \* \* \*